United States Patent [19]

Tanaka

[11] 4,327,382

[45] Apr. 27, 1982

[54] METHOD AND APPARATUS FOR EDITING DIGITAL SIGNALS RECORDED ON A RECORD MEDIUM

[75] Inventor: Masato Tanaka, Tokyo, Japan

[73] Assignee: Sony Corporation, Tokyo, Japan

[21] Appl. No.: 116,401

[22] Filed: Jan. 29, 1980

[30] Foreign Application Priority Data

Jan. 30, 1979 [JP] Japan .................................. 54-9498
Jan. 30, 1979 [JP] Japan .................................. 54-9500
Jan. 31, 1979 [JP] Japan .................................. 54-10650

[51] Int. Cl.³ ........................ G11B 27/02; G11B 5/00
[52] U.S. Cl. ......................................... 360/13; 360/32
[58] Field of Search ............................ 360/13, 32, 40

[56] References Cited

U.S. PATENT DOCUMENTS 3,190,969  6/1965  Mattis ................................... 360/13
4,211,997  7/1980  Rudnick et al. ....................... 360/32

Primary Examiner—Vincent P. Canney
Attorney, Agent, or Firm—Lewis H. Eslinger; Alvin Sinderbrand

[57] ABSTRACT

Digital signals, such as PCM-encoded audio signals, are reproduced, delayed, and then mixed with edit digital signals which are supplied from a suitable source. Mixing is carried out by gradually decreasing the value of one while concurrently gradually increasing the value of the other digital signals and combining the decreasing and increasing signals such that one of them gradually is replaced by the other. The resultant mixed digital signals then are recorded by a recording transducer which is spaced from the reproducing transducer by an amount corresponding to the aforementioned delay. In one embodiment, the digital signals are recorded in a single track on a record medium in the form of a sequence of data blocks, each data block being formed of plural data (i.e. PCM) words and an error check work (e.g. obtained by the so-called full adding code) associated with the plural data words. In another embodiment, the digital signals are recorded in separate parallel tracks, each track containing a sequence of data blocks with each data block having plural data words and an error check word. In an alternative embodiment wherein the digital signals are recorded as separate sequences of data blocks in respective parallel tracks, the data blocks in one track which normally are in time-alignment with corresponding data blocks in the other track are displaced therefrom.

47 Claims, 33 Drawing Figures

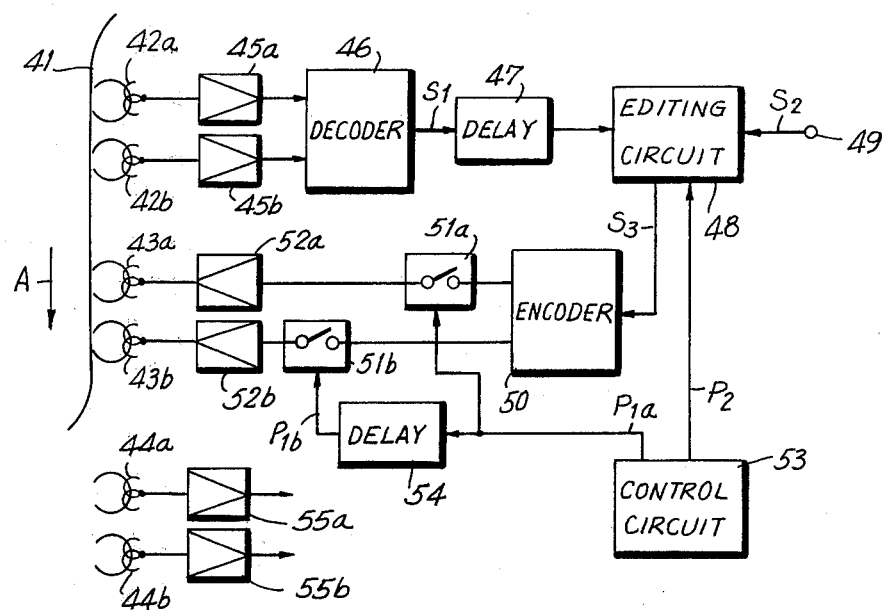
FIG. 9
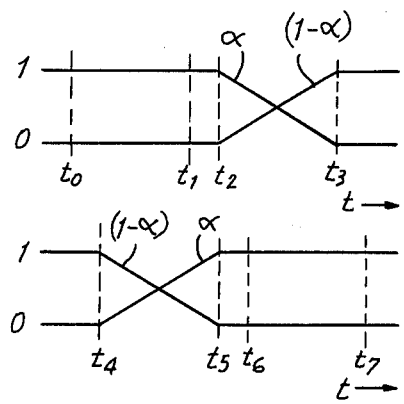
FIG. 10A
FIG. 10B
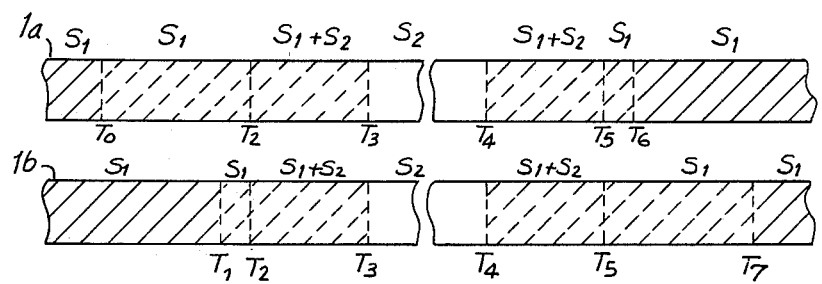
FIG. 11

FIG. 19A — FIG. 19F

METHOD AND APPARATUS FOR EDITING DIGITAL SIGNALS RECORDED ON A RECORD MEDIUM

BACKGROUND OF THE INVENTION

This invention relates to a method and apparatus for editing digital signals which are recorded on a record medium and, more particularly, to such a method and apparatus wherein digital signals, such as PCM-encoded audio signals are electronically edited to carry out an insert mode or assemble mode of electronic editing.

In the field of magnetic recording, two types of editing are well-known: physical editing, wherein information recorded on one magnetic tape, such as audio information, and information recorded on another magnetic tape are combined by splicing the two tapes together; and electronic editing wherein information from a separate source is combined electronically with information previously recorded on a magnetic tape. The physical editing technique generally is used when the information recorded on the magnetic tape is relatively low frequency information, such as recorded audio signals.

Generally, electronic editing is used when the information recorded on the magnetic tape is relatively high frequency information, such as video signals. In electronic editing, edit signals, which may be supplied from a suitable source, such as another record medium, a suitable memory device, or the like, is inserted or assembled with original information. For example, original information on one record medium may be rerecorded onto another record medium until a suitable edit point is reached. At that time, the edit information is substituted for the original information, and this substituted edit information is recorded on the second record medium. Subsequently, the original information is recorded once again on the second record medium, resulting in the edit information being "inserted" into the original information. Electronic editing often is used in preparing video tape for video tape recording (VTR) broadcast purposes.

Recently, high quality audio recordings have been made by digitally encoding the audio signals to, for example, pulse code modulation (PCM) format and then recording such PCM-encoded audio signals. For example, in application Ser. No. 771,350, filed Feb. 23, 1977, left and right channel audio signals are sampled, encoded in PCM form, and the PCM signals are recorded on magnetic tape by a conventional VTR device. Various improvements on the digital, or PCM, recording technique have been proposed in order to avoid or minimize errors that might occur due to drop-out, burst error distortion, and the like. These improvements contemplate various types of error correction recording, some examples of which are described in U.S. application Ser. No. 905,894, filed May 15, 1978, and in U.S. application Ser. No. 30,652, filed Apr. 16, 1979.

Although audio information is recorded by the aforementioned digital recording techniques, it is difficult to utilize physical editing, or splicing, with such recorded signals. Even if digitally recorded tape can be spliced successfully, the presence of a splice will introduce errors into one or more of the digital signals, or data words, which represent the audio information. Therefore, there is a definite need for an electronic editing technique in order to edit the digital signals which are recorded on such magnetic tape.

Audio information generally is slowly-varying and, is sampled at a satisfactory sampling rate, a particular digitized sample, or a data word, may be closely approximated by interpolating the information derived from the next preceding and succeeding digitized samples, or data words. Thus, audio information may be recorded as a single track of data words, and even if one data word is distorted or obliterated in that track, the information represented thereby may, nevertheless, be recovered by conventional interpolation techniques. Furthermore, if the data words are in two pairs, and each pair of data words is used to generate an error check word, such as by use of the well-known full adding code, a distorted or obliterated one data word in that pair may be recovered by processing the remaining data with the error check code. However, if both data words are distorted, or if a data word and its associated error check code are distorted, the information represented thereby may be lost, and the audio information which ultimately is recovered may contain undesired interference and distortion. This is a strong possibility when simple switching circuits are used to insert and/or remove digital signals during an edit operation. The use of such switching circuits may result in the recording of switching noise which distorts or obliterates the data words on the record medium.

As an alternative recording technique, the digital words representing the audio signals may be recorded in parallel tracks, with odd-numbered words recorded in one track and even-numbered words recorded in the other track. It is thought that, even if a substantial number of data words in one track are distorted or obliterated, the information represented by such words may, nevertheless, be recovered by, for example, interpolation techniques or other error-correcting techniques from the undistorted data words in the other track. However, even with this recording technique, when edit signals are switched for recording, switching noise will appear concurrently, or in time-alignment, on both tracks. Hence, a data word in one track as well as a related data word in the other track may be distorted, resulting in loss of information and undesired interference in the audio signals which ultimately are reproduced.

OBJECTS OF THE INVENTION

Accordingly, it is an object of the present Invention to provide an improved method and apparatus for editing digital signals wherein the aforementioned disadvantages and difficulties attending prior art recording techniques are avoided.

Another object of this invention is to provide an electronic editing technique for use in editing digital signals, such as PCM-encoded audio signals.

A further object of this invention is to provide a method and apparatus for editing digital signals which are recorded in parallel tracks on a record medium, wherein loss of information or distortion is minimized even when noise may be introduced by reason of the editing operation.

An additional object of this invention is to provide a method and apparatus for providing a smooth transition between original data and edit data when such data is recorded in digital form.

Various other objects, advantages and features of the present invention will become readily apparent from the ensuing detailed description, and the novel features will be particularly pointed out in the appended claims.

SUMMARY OF THE INVENTION

In accordance with this invention, an apparatus and method are provided for editing digital signals, such as PCM-encoded audio signals, which are recorded on a record medium. The digital signals are reproduced and delayed by a predetermined time delay. Edit digital signals, provided from a source, are mixed with the delayed reproduced digital signals by gradually decreasing the value of one while concurrently gradually increasing the value of the other and combining the decreasing and increasing signals such that one of the digital signals gradually is replaced by the other. The resultant mixed digital signals then are recorded by a recording transducer which is spaced from the reproducing transducer by an amount corresponding to the predetermined time delay. In one embodiment, the digital signals are formed of a channel of data words which are recorded in separate parallel tracks; for example, the odd-numbered words are recorded in one track and the even-numbered words are recorded in the other track. Prior to the actual editing operation, the originally-recorded digital signals are reproduced and supplied to the recording transducers for re-recording. To avoid switching noise from being recorded in alignment on both tracks, the re-recording of one track is switched ON in advance of the re-recording of the other track. In an alternative embodiment, the originally-recorded data words in one track are displaced from their related originally-recorded data words in the other track. In this alternative embodiment, even if the re-recording of the original data words for both tracks is switched ON simultaneously, the displacement, or shifting, of the related data words in one track relative to those in the other enables obliterated information (due to recorded switching noise) to be recovered.

BRIEF DESCRIPTION OF THE DRAWINGS

The following detailed description, given by way of example, will best be understood in conjunction with the accompanying drawings in which:

FIG. 9 is a block diagram of another embodiment of editing apparatus in accordance with the present invention;

FIGS. 10A and 10B represent how the mixing circuit in the embodiment of FIG. 9 operates;

FIG. 11 is useful in understanding the relationship of the various signals which are recorded by the embodiment of FIG. 9;

FIGS. 19–19F represent the data format of the digital signals processed by the embodiment shown in FIG. 16.

DETAILED DESCRIPTION OF CERTAIN PREFERRED EMBODIMENTS

In the following description, it is assumed that the editing apparatus of the present invention is used to edit digital signals. These digital signals preferably may represent audio information and may be of the so-called PCM-encoded audio signal format. It will be readily appreciated to those of ordinary skill in the art that the digital signals may represent other information, as desired. Furthermore, in the interest of expediting the understanding of the present invention, it is assumed that the digital signals are recorded on a magnetic tape. However, other record media which are readily adapted to have information recorded thereon may be used. Furthermore, in recording the digital signals on magnetic tape, the recording and reproducing transducers, or heads, are illustrated as being fixed and the magnetic tape is movable therepast. Those of ordinary skill in the art will readily appreciate that the transducers may be of the rotary type, such as conventionally used in VTR apparatus, and that the magnetic tape may be movable in a helical pattern such that the rotary heads scan helical traces, or record tracks, across the tape.

Figure 1:
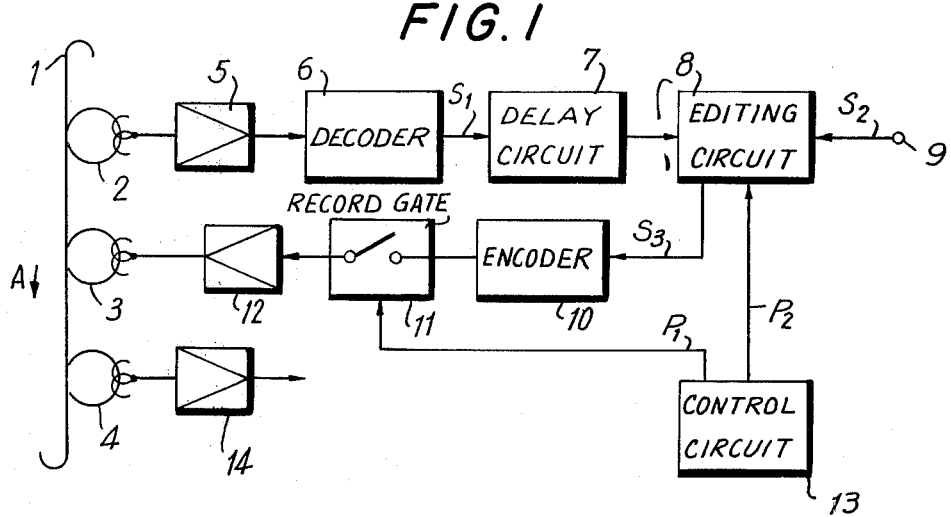
FIG. 1 is a block diagram of one embodiment of editing apparatus in accordance with the present invention.

Referring now to FIG. 1, originally-recorded digital signals are recorded on magnetic tape, the latter being movable in the direction indicated by arrow A. Associated with tape 1 are a reproducing transducer, or head, 2, a recording transducer 3 and a monitor transducer 4. As mentioned above, these transducers may be fixed and magnetic tape 1 is movable therepast; or alternatively, these transducers may be rotary transducers to scan helical traces or tracks across the tape. Although not shown herein, an erase transducer, or head, also may be provided to erase the signals which are recorded in one or more tracks on magnetic tape 1.

The editing apparatus in accordance with one embodiment of this invention is comprised of a decoder 6, a delay circuit 7, and editing circuit 8, an encoder 10, a record gate, or switch, 11 and a control circuit 13. Decoder 6 is coupled to reproducing transducer 2 via a playback amplifier 5. Typically, the digital signals recorded on magnetic tape 1 are comprised of data words which are modulated into a suitable recording code, such as NRZI, 3PM, MFM, or the like. Decoder 6 includes a demodulator circuit for demodulating such codes. Also, the data words may be encoded in a suitable error correcting code, and error check words as well as error correcting code words (such as the CRC code word) also may be interleaved with the data words. Decoder 6 is adapted to utilize such error correcting codes to recover data information from the reproduced digital signals. One embodiment of decoder 6 is described hereinbelow with respect to FIG. 6.

The digital signals, or data words, recovered by decoder 6 are delayed in a delay circuit 7 and supplied to editing circuit 8. The editing circuit is described below with respect to FIG. 2 and merely need be described herein as functioning as a mixing circuit. That is, when in operation, editing circuit 8 is adapted to mix the recovered digital signals with edit digital signals supplied to the editing circuit from a suitable source. The supplied edit digital signals are applied to an input terminal 9 from such a source. Typically, the source of edit digital signals may comprise a storage medium, such as another magnetic tape, a memory device, or the like. Still further, the edit digital signals may be generated in so-called real time from, for example, an audio program which may be in process. Editing circuit 8 also includes a control input coupled to control circuit 13 for receiving start/stop edit control signals. These control signals are used to initiate and terminate an editing operation.

The output of editing circuit 8, which provides mixed digital signals obtained by mixing the reproduced digital signals and the supplied edit digital signals is coupled to encoder 10. One embodiment of the encoder is described below with respect to FIG. 7. Encoder 10 may include suitable error correcting encoding circuitry for generating an error check word in response to, for example, a pair of associated data words which are supplied from editing circuit 8. The encoder also may be generate an error correcting code word and may be adapted to arrange the various data and error code words in a suitable format suitable for recording. Furthermore, encoder 10 may include a modulator circuit for modulating the digital signals in an appropriate recording format, such as NRZI, 3PM, MFM, and the like.

The output of encoder 10 is coupled to a recording amplifier 12 via record gate 11. The record gate is schematically illustrated herein as a switching circuit having a control input coupled to control circuit 13. The record gate is adapted to respond to a switch control signal to supply the digital signals from encoder 10 through amplifier 12 to recording transducer 3.

Control circuit 13 is adapted to generate the start/stop edit control signal and the switch control signal in response to the commanded commencement and termination of an editing operation. For example, a manually operable switch (not shown) may be closed by an operator to initiate the edit operation, and this switch may be released, or another manual switch may be operated, to terminate the edit operation. Control circuit 13 may include suitable pulse generating and gating circuits to generate edit and switch control pulses.

In operation, digital signals which are recorded on magnetic tape 1 are reproduced by reproducing transducer 2. These reproduced digital signals may be encoded in any of the aforementioned formats, and also may include error correction signals, as is conventional in the recording of digital information. The reproduced digital signals are amplified in playback amlifier 5 and supplied to decoder 6. The demodulator included in decoder 6 demodulates the reproduced digital signals, for example, the demodulator recovers a binary code from the NRZI, 3PM, MFM, or the like, format which the digital signals have been recorded. The demodulated digital signals, or binary signals, then are subjected to a time base correction in order to remove any time base error that may be present therein. Furthermore, in the event of errors that may have been introduced into the digital signals, such as by drop-out, burst error, or the like, the error correction signals which also are recorded with the data words of the digital signals, are used in a suitable error correction circuit so as to recover the orginally-recorded data. This recovered data, which still is in digital format, such as in binary code, is produced at the output of decoder 6 as digital signals $S_1$. These digital signals may be referred to herein as the original digital signals.

Let it be assumed that an edit operation has not been initiated. Hence, start/stop edit control pulse $P_2$ is not produced by control circuit 13; nor is switch control pulse $P_1$ produced thereby. Consequently, original digital signals $S_1$ are supplied to editing circuit 8 via delay circuit 7. These delayed original digital signals $S_1$ are not mixed with any edit digital signals $S_2$ which may be supplied to input terminal 9 because of the absence of the start/stop edit control pulse $P_2$. Thus, and as will be described below, the original digital signals $S_1$, after being delayed in delay circuit 7, pass through editing circuit 8 without being modified therein. These original digital signals appear at the output of the editing circuit as digital signals $S_3$. Such signals $S_3$ are supplied to encoder 10 whereat error check words are produced therefrom and are combined therewith. In addition to combining digital signals $S_3$ with error check words, the combined digital signals are modulated in an appropriate recording format (e.g. NRZI, 3PM, MFM, and the like). The modulated digital signals are supplied from encoder 10 to record gate 11. However, at this time, in the absence of a switch control pulse $P_1$, the record gate inhibits the modulated digital signals received from encoder 10 from being supplied to recording transducer 3. Thus, the originally recorded digital signals on magnetic tape 1 are not modified, or edited. If desired, these recorded digital signals may be monitored by monitoring transducer 4, which functions as a reproducing transducer. The digital signals reproduced by monitoring transducer 4 are amplified by a monitoring amplifier 14 and then may be decoded and converted to analog form so as to recover the recorded audio information. This audio information then may be sensed by, for example, a loudspeaker or the like.

In the event that an edit operation is to be carried out, control circuit 13 is energized in a manner mentioned hereinabove so as to produce switch control pulse $P_1$ and, at a delayed time thereafter, a start edit control pulse $P_2$. Record gate 11 is actuated in response to the switch control pulse $P_1$ so as to supply the digital signals produced at the output of encoder 10 to recording transducer 3. Of course, since the start edit control pulse $P_2$ has not yet been produced, editing circuit 8 does not modify the digital signals $S_1$ supplied thereto. Consequently, the digital signals provided at the output of encoder 10 are substantially the same as the digital signals supplied to the input of decoder 6, except for the delay imparted by delay circuit 7. The purpose of this delay circuit 7 is to "match" the delay attending the movement of a predetermined point of tape 1 from reproducing transducer 2 to recording transducer 3. That is, the original digital signals $S_1$ are delayed in delay circuit 7 such that they are supplied to recording transducer 3 at the very same time that the point from which the original digital signal had been reproduced reaches this recording transducer. Consequently, the information which had been originally recorded on magnetic tape 1 and which had been reproduced by reproducing transducer 2 is re-recorded at its original location on magnetic tape 1 by recording transducer 3. It is appreciated that the time delay imparted by delay circuit 7 is a function of the speed at which tape 1 is driven and the relative spacing between the recording and reproducing transducers.

Figure 2:
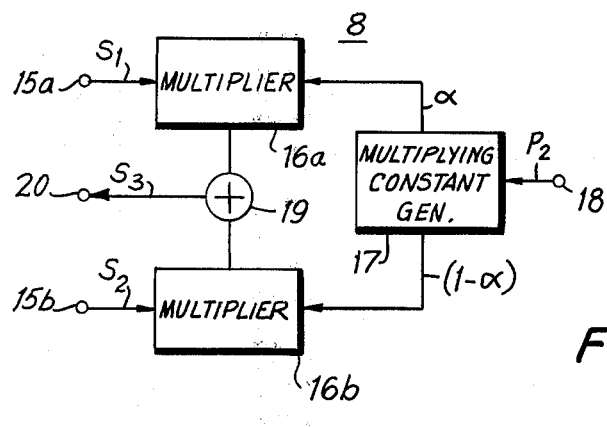
FIG. 2 is a block diagram of a mixing circuit which can be used with the editing apparatus of this invention.

The manner in which editing circuit 8 operates in response to the start edit control pulse $P_2$ will best be understood by the following explanation of one embodiment of the editing circuit. Referring to FIG. 2, editing circuit 8 is illustrated as comprising multiplier circuits 16a and 16b, a multiplier constant generator 17 and a summing circuit 19. Multiplier circuits 16a and 16b are digital multiplier circuits known to those of ordinary skill in the art. Multiplier circuit 16a is connected to an input terminal 15a to receive the original, delayed digital signals $S_1$ which are reproduced from magnetic tape 1 by reproducing transducer 2. Multiplier circuit 16b is connected to an input terminal 15b to receive the edit digital signals $S_2$ which are supplied thereto from a suitable source (not shown) of such edit digital signals.

Multiplying constant generator 17 includes a control input 18 to receive the start/stop edit control pulse $P_2$. The multiplying constant generator may include a counting circuit, such as a digital counter, responsive to a start edit control pulse to generate a digital count which increments from one value to another. For example, this count may decrease from a predetermined value, such as unity, in a stepwise manner to zero. This count appears as a multiplier constant $\alpha$; and the complement of the multiplier constant also is produced by multiplying constant generator 17 as the complementary signal $(1-\alpha)$. Thus, as the multiplier constant $\alpha$ gradually decreases, the complement of the multiplier constant, i.e. $(1-\alpha)$, gradually increases. Conversely, in response to a stop edit control pulse, multiplying constant generator 17 generates a progressively increasing multiplier constant $\alpha$ and a progressively decreasing complement $(1-\alpha)$. Preferably, the progressively changing constants $\alpha$ and $(1-\alpha)$ vary from a zero value to a value of unity. If desired, other values may be selected.

The multiplier constant $\alpha$ generated by multiplying constant generator 17 is supplied to digital multiplier circuit 16a; and the complement of of the multiplier constant $(1-\alpha)$, is supplied to a digital multiplier circuit 16b. Each of the digital multiplier circuits is adapted to digitally multiply the constants applied thereto from multiplying constant generator 17 and the digital signal ($S_1$ or $S_2$) supplied thereto from input terminals 15a and 15b, respectively. The products of such multiplication produced by the digital multiplier circuits are supplied to summing circuit 19 whereat they are digitally added to produce a mixed digital signal $S_3$. This mixed digital signal is supplied to an output terminal 20.

Figure 3A:
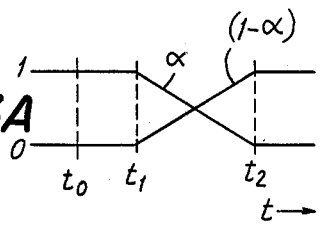
FIGS. 3A and 3B are diagrammatic representations of the manner in which the mixing circuit of FIG. 2 operates.

The manner in which the illustrated editing circuit 8 operates in the environment shown in FIG. 1 now will be described with reference to FIGS. 3A and 3B. Let it be assumed that, at time $t_0$, control circuit 13 is energized to produce switch control pulse $P_1$. Hence, record gate 11 is actuated to supply the digital signals received from encoder 10 to recording transducer 3. At time $t_0$ as shown in FIG. 3A, the multiplier constant $\alpha$ has a value equal to unity, and the complement of the multiplier constant $(1-\alpha)$ has a value equal to zero. Thus, the original digital signals $S_1$ which are reproduced from magnetic tape 1 are digitally multiplied by unity in multiplier circuit 16a; and the edit digital signals $S_2$ which are supplied to the editing circuit are digitally multiplied by zero. It is, therefore, appreciated that the mixed digital signal $S_3$ produced at time $t_0$ is equal to the original digital signal $S_1$, because:

$$S_3 = \alpha S_1 + (1-\alpha)S_2$$

$$S_3 = S_1 + 0$$

At time $t_1$, control circuit 13 supplies the stop edit control pulse $P_2$ to a multiplier constant generator 17. The time delay $t_0$-$t_1$ may be obtained automatically by a suitable delay circuit included in control circuit 13 or, alternatively, time $t_1$ may be determined by the actuation of a suitable control switch by an operator. In any event, at time $t_1$, the multiplier constant $\alpha$ progressively decreases in value in a stepwise manner, that is, the value of this constant decrease progressively with respect to time, from the value unity to the value zero. Concurrently, the complement of the multiplier constant $(1-\alpha)$ progressively increases in a stepwise manner from the value zero to the value unity. It is appreciated that, as the multiplier constant $\alpha$ gradually decreases in value, the value of the multiplied digital signal $\alpha S_1$ supplied to summing circuit 19 by digital multiplying circuit 16a likewise decreases. Concurrently, as the complement of the multiplier constant $(1-\alpha)$ gradually increases in value, the value of the multiplied edit digital signals $(1-\alpha)S_2$ produced by digital multiplier circuit 16b likewise increases. Consequently, during the gradual change in the values of these constants, the mixed digital signals $S_3$ supplied to output terminal 20 by summing circuit 19 contains a decreasing value of the original digital signal $S_1$ and an increasing value of the edit digital signal $S_2$. That is, the original digital signal appears to fade out and the edit digital signal appears to fade in.

At time $t_2$ (FIG. 3), the value of the multiplier constant $\alpha$ has been reduced to zero, and the value of the complement of the multiplier constant $(1-\alpha)$ has increased to unity. Thus, at time $t_2$, the mixed digital signal $S_3$ provided at output terminal 20 is equal only to the edit digital signal $S_2$. The fade-in of the edit digital signal accompanied by the fade-out of the original digital signal during the interval $t_1$-$t_2$ is referred to herein as a cross-fade operation. It is recognized that the edit digital signal $S_2$ is supplied to encoder 10 from time $t_2$ until a stop edit control pulse is produced.

Let it be assumed that the stop edit control pulse $P_2$ is produced at time $t_3$. Control circuit 13 may generate this pulse automatically in response to, for example, the release of an edit control switch or in response to the actuation of a STOP edit switch, or the like. In any event, from time $t_3$ until time $t_4$, the cross-fade operation described above is repeated, except that now the multiplier constant $\alpha$ increases in a stepwise manner while the complement of the multiplier constant $(1-\alpha)$ decreases in a stepwise manner. Thus, during the interval $t_3$-$t_4$, the cross-fade operation results in a fading-in of the original digital signal $S_1$ which is reproduced from magnetic tape 1 and a concurrent fading-out of the edit digital signal $S_2$. Thus, during this interval $t_3$–$t_4$, the mixed digital signals $S_3$ are constituted by an increasing value of the original digital signal $S_1$ and a decreasing value of the edit digital signal $S_2$.

At time $t_4$, the value of the multiplier constant $\alpha$ has returned to unity and the value of the complement of the multiplier constant $(1-\alpha)$ has returned to zero. Hence, from time $t_4$ the mixed digital signal $S_3$ is constituted solely by the originally-recorded digital signal $S_1$. It is seen, from the embodiment of FIG. 1 discussed above, that from time $t_4$, this originally-recorded digital signal, provided at the output of editing circuit 8, is re-recorded on magnetic tape 1. Furthermore, by reason of delay circuit 7, the original digital signal is re-recorded on the very same position from which it had been reproduced.

Figure 3B:
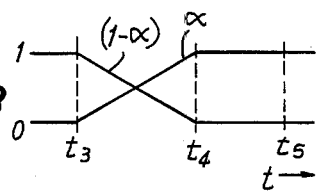

It is further assumed, from FIG. 3B, that at time $t_5$, the switch control pulse $P_1$ terminates. This deactuates, or inhibits, record gate 11 so as to prevent further recording of digital signals by recording transducer 3. The edit operation thus is fully completed.

Figure 4:
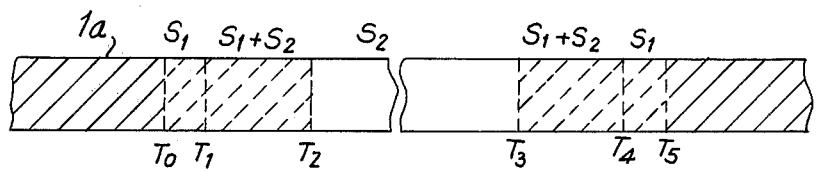
FIG. 4 is a schematic representation of a track of magnetic tape in which an insert edit operation has been carried out.

FIG. 4 illustrates in schematic form a track 1a on magnetic tape 1 in which the digital signals which are processed by the editing apparatus illustrated in FIG. 1 are recorded. The areas in track 1a which are represented by the solid hatched area have the original digital signal $S_1$ recorded therein. Those portions of track 1a which are represented by the broken hatched area have the mixed digital signal $S_3$ recorded therein.

Finally, that portion of track 1a represented by the blank area has the edit digital signal $S_2$ recorded therein.

It is assumed that location $T_0$ along track 1a corresponds to time $t_0$ at which the switch control pulse $P_1$ is produced. It is recalled that, at this time, record gate 11 is actuated such that the originally-recorded digital signal $S_1$ which is reproduced from track 1a by reproducing transducer 2 is re-recorded at the very same location in this track by recording transducer 3. Thus, from location $T_0$, the mixed digital signal $S_3$ is recorded, but $S_3=S_1$. At location $T_0$, the so-called cut-in (or punch-in) operation is initiated.

At time $t_1$, the start edit control pulse $P_2$ is produced. Location $T_1$ along track 1a corresponds to time $t_1$, whereupon the cross-fade operation is initiated. That is, and as discussed above, from location $T_1$, the mixed digital signal $S_3$ is constituted by a progressively decreasing value of the originally-recorded digital signal $S_1$ and a progressively increasing value of the edit digital signal $S_2$. Hence, from location $T_1$ to location $T_2$, the mixed digital signal $S_3$ is recorded, wherein $S_3=S_1+S_2$.

At time $t_2$, the aforementioned cross-fade operation terminates. This time corresponds to location $T_2$ along track 1a. Hence, from location $T_2$ until location $T_3$, the edit digital signal $S_2$ is recorded. At time $t_3$, corresponding to location $T_3$ along the track 1a, the cross-fade operation once again is initiated. Now, however, as was discussed with reference to FIG. 3B, the level of the edit digital signal $S_2$ is gradually reduced while the level of the originally-recorded digital signal $S_1$ is increased. This is known as the so-called cut-out (or punch-out) operation. In accordance with this cut-out operation from location $T_3$ to location $T_4$, the mixed digital signal $S_3$ is recorded, wherein $S_3=S_1+S_2$.

At time $t_4$, the cross-fade operation terminates. Hence, from location $T_4$, only the originally-recorded digital signal $S_1$ is re-recorded. The cut-out operation terminates at time $t_5$, corresponding to location $T_5$, whereupon the switch control pulse $P_1$ functions to deactuate or inhibit, record gate 11. Hence, from location $T_5$, the output from editing circuit 8 supplied through encoder 10, no longer is recorded. That is, the overall editing operation is fully completed and no further recording occurs until another edit operation is initiated.

Figure 5A:
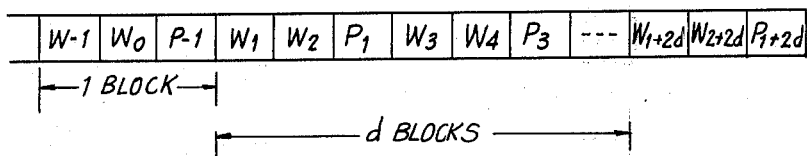
FIGS. 5A and 5B represent the arrangement of data which may be recorded by the apparatus of FIG. 1.

Referring to FIG. 5A, there is illustrated one format in which the digital signals recorded on magnetic tape 1 may be arranged. The digital signals representing information, such as audio information, for example, the PCM-encoded audio signals, are formed into words, referred to as data words $W_i$. Each of these data words may be comprised of, for example, 16 bits. As an example, each 16-bit data word may represent a sample of a left channel audio signal and a right channel audio signal. As another example, the 16-bit data word may represent a single encoded sample of an analog signal. In any event, if the analog information represented by the data words is slowly-varying, or if such information is relatively redundant, then adjacent data words are sufficiently related to each other such that the information represented by one may be substantially reproduced by interpolation. That is, data word $W_2$, for example, is sufficiently related to its adjacent data words $W_1$ and $W_3$ that the information represented thereby may be substantially recovered by interpolating (or averaging) data words $W_1$ and $W_3$.

The data words which are recorded on magnetic tape 1 are arranged in successive blocks of data words. As a simple example thereof, each block of data words is constituted by two adjacent data words, such as data words $W_1$ and $W_2$, followed by an error check word which is associated with the two data words contained in that block. The error check word, represented as $P_i$, is produced by the so-called full adding code wherein its associated data words are summed. That is, the error check word $P_i$ is a 17-bit word and is produced as the full adding code $P_i=(W_i+W_{i+1})$. Thus, the first-illustrated data block in FIG. 5 is formed of two successive, related data words and their associated error check word, represented as $W_{-1}$, $W_0$, $P_{-1}$. The next sequential data block is represented as $W_1$, $W_2$ and $P_1$. The next-following sequential data block is represented as $W_3$, $W_4$ and $P_3$. Thus, as shown in FIG. 5A, the digital signals recorded on magnetic tape 1 are arranged in successive data blocks, these data blocks being formed of sequential data words $W_i$, and each data block containing, in the illustrated example, two data words $W_i$, $W_{i+1}$ and their associated error check word $P_i$, this error check word being the full adding code word.

With the format shown in FIG. 5A, if one or the other data word in a particular data block is distorted or obliterated, that word nevertheless can be reproduced by performing a subtracting operation wherein the undistorted data word is subtracted from the associated error check word. For example, if data word $W_2$ is distorted, it nevertheless can be recovered by carrying out the error-correction operation $W_2=(P_1-W_1)$. Similarly, if data word $W_1$ is distorted, it may be recovered by subtracting data word $W_2$ from error check word $P_1$. Still further, if the information represented by the data words is slowly varying, or is redundant, a close approximation of the two data words in a particular data block may be made, even if both such data words are distorted, by obtaining the average of their associated error check word. That is, if both data words $W_1$ and $W_2$ are distorted, close approximation thereof may be obtained by averaging their associated error check word $P_1$, wherein $P_{\frac{1}{2}} = (W_1 + W_2)/2$.

Figure 5B:
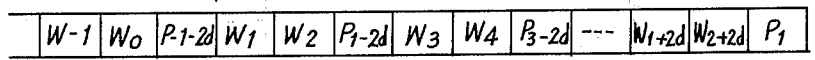

It is appreciated that, if all of the digital words within a data block are distorted, that is, if both data words and their associated error check word are distorted, it is difficult to recover such data words. This type of distortion may occur due to drop-out, burst error and the like. To minimize the effects of such an error, it is preferred to record the error check word in a data block which is spaced from the data block in which the data words associated with that error check word are recorded. That is, instead of recording error check word $P_1$ in the same data block which contains data words $W_1$ and $W_2$, error check word $P_1$ is recorded in another, spaced apart block. For example, and as shown in FIG. 5B, error check word $P_1$ is recorded in the same block in which data words $W_{1+2d}$ and $W_{2+2d}$ are recorded. Thus, the data block in which error check word $P_1$ is recorded is spaced from the data block in which its associated data words $W_1$ and $W_2$ are recorded by d data blocks. In accordance with this example, the data block in which data words $W_1$ and $W_2$ are recorded also contains error check word $P_{1-2d}$, as shown in FIG. 5B. The data block in which an error check word is recorded is effectively delayed by d blocks from the data block in which its associated data words are recorded. Stated otherwise, the error check words are delayed and then interleaved with the sequence of data words. Thus, if drop-out, burst error or the like results in distortion of an entire data block, the data words in that distorted block may, nevertheless, be substantially approximated by averaging the delayed associated error check word which, of course, is recorded in a separate block and will not be distorted.

Although not shown in FIG. 5, further minimizing of error due to distortion can be attained by recording related data words in different data blocks. For example, the even-numbered data words may be delayed with respect to the odd-numbered data words, and then these delayed data words can be interleaved with the undelayed data words, and also with the delayed error check words. This will result in, for example, data word $W_1$ being recorded in one data block, its related data word $W_2$ being recorded in another data block and their associated error check word $P_1$ being recorded in a still further data block. Thus, even if an entire data block is distorted, with this alternative format, only one of digital words $W_1$, $W_2$ and $P_1$ will be distorted. The remaining two digital words can be processed easily to recover the distorted word.

Preferably, although not shown in FIGS. 5A and 5B, an error detecting code, such as the CRC code, and a parity code are inserted, or interleaved, after every predetermined number of data blocks.

Figure 6:
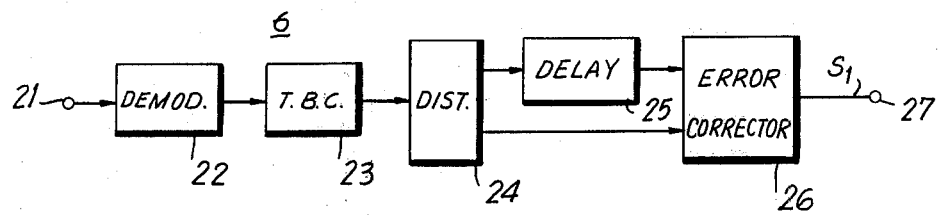
FIG. 6 is a block diagram of decoder apparatus which may be used with the embodiment of FIG. 1.

One embodiment of decoder 6 which can be used with the recording format illustrated in FIG. 5B is shown in FIG. 6. Decoder 6 is comprised of a demodulator 22, a time base correcting circuit 23, a distributing, or separating circuit 24, a delay circuit 25 and an error correcting circuit 26. Demodulator 22 is coupled to an input terminal 21 to receive the digital signals reproduced from magnetic tape 1 by reproducing transducer 2. The demodulator is adapted to demodulate the recording code, such as NRZI, 3PM, MFM, or the like, used for the recording of such digital signals. The demodulated digital signals, which may appear as the sequence of data blocks shown in FIG. 5B, are supplied to time base correcting circuit 23 wherein time base errors are corrected. Time base correcting circuits are known to those of ordinary skill in the art and the manner in which they correct time base errors in signals reproduced from magnetic tape are well known. Hence, further description of time base correcting circuit 23 is not provided.

The output of time base correcting circuit 23 is coupled to distributing, or separating circuit 24. This separating circuit serves to de-interleave, or demultiplex, the sequential data blocks shown in FIG. 5B. More particularly, distributing circuit 24 serves to separate the data words $W_i$ from the error check words $P_i$ in the sequentially received data blocks. Distributing circuit 24 is provided with a pair of outputs at which the separated data words and error check words, respectively, are obtained. The output from which the sequence of data words is derived is connected to delay circuit 25, and the other output at which the error check words are derived is connected to error correcting circuit 26. Delay circuit 25 is adapted to delay the sequence of data words by an amount corresponding to d data blocks, that is, the delay between the occurrence of a data block in which an error check word is provided and the occurrence of the data block in which the data words associated with that error check word are provided. This delay, or spacing between such data blocks, is illustrated in FIG. 5B.

Error correcting circuit 26 is adapted to utilize the error check word supplied thereto from distributing circuit 24 to correct errors which may be present in one or both of the delayed data words which are associated with that error check word and which are supplied by delay circuit 25. The output of error correcting circuit 26 is connected to an output terminal 27.

Although not illustrated in FIG. 6, if a CRC code is provided in the sequence of data blocks shown in FIG. 5B, a CRC code detector may be connected to the output of time base correcting circuit 23 to detect this CRC and to supply error correcting signals in response thereto to error correcting circuit 26.

It is appeciated that distributing circuit 24 supplies the sequential data words $W_1$, $W_2$, $W_3$, ... $W_{1+2d}$, $W_{2+2d}$ to delay circuit 25. Of course, as shown in FIG. 5B, when data words $W_1$ and $W_2$ are received, distributing circuit 24 supplies error check word $P_{1-2d}$ to the error correcting circuit. When data words $W_3$ and $W_4$ are received, distributing circuit 24 supplies error check word $P_{3-2d}$ to the error correcting circuit. Similarly, when data words $W_{1+2d}$ and $W_{2+2d}$ are received, the distributing circuit supplies the error check word $P_1$ to error correcting circuit 26. Delay circuit 25 delays the sequence of data words sufficiently such that at the time that the delayed data words $W_1$ and $W_2$ are supplied to error correcting circuit 26, d blocks of data words have been received by distributing circuit 24 and the distributing circuit now supplies the error check word $P_1$ to error correcting circuit. Hence, delay circuit 25 serves to supply the data words to error correcting circuit 26 in substantial time-alignment with their associated error check word, the latter having been reproduced from magnetic tape 1 at a later time than the reproduction of its associated data words. Consequently, even with the interleaved relationship shown in FIG. 5B, error correcting circuit 26 is supplied with the appropriate data and error check words in order to recover a data word that possibly may have been distorted because of drop-out, burst error or the like. Hence, even though the format illustrated in FIG. 5B is recorded on the magnetic tape, distributing circuit 24 and delay circuit 25 function to rearrange this format to conform with that illustrated in FIG. 5A.

Error correcting circuit 26 supplies the originally-recorded, error-corrected digital signals $S_1$ to delay circuit 7 (FIG. 1). It is appreciated that these digital signals $S_1$ are constituted by sequential data words $W_1$, $W_2$, ... $W_i$. These digital signals $S_1$ are mixed with edit digital signals $S_2$ in editing circuit 8 in a manner discussed in detail hereinabove, in order to carry out an edit operation. The resultant mixed digital signals $S_3$ supplied from the editing circuit are in the form of sequential data words, and this sequence of data words is supplied to encoder 10.

Figure 7:
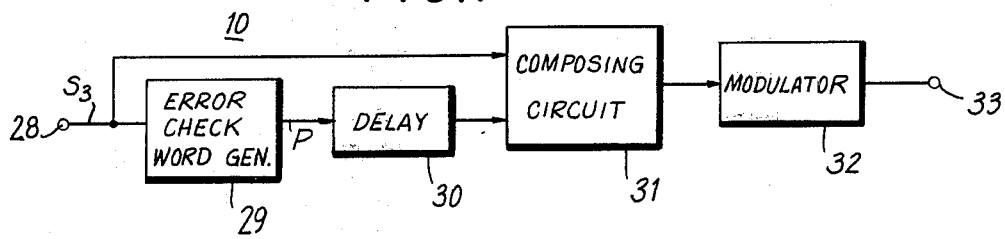
FIG. 7 is a block diagram of encoder apparatus which may be used with the embodiment of FIG. 1.

One embodiment of encoder 10 which is capable of rearranging the sequential data words in the format illustrated in FIG. 5B is shown in FIG. 7. The encoder is comprised of an error check word generator 29, a delay circuit 30, a composing circuit 31 and a modulator 32. Error check word generator 29 is connected to an input terminal 28 to receive the mixed digital signals $S_3$ supplied thereto by editing circuit 8. The error check word generator is adapted to generate the full adding code in response to two successive data words. Such an error check word generator is known to those of ordinary skill in the art and need not be further described.

The output of the error check word generator is coupled to delay circuit 30, this delay circuit being adapted to impart a d-block delay to the error check words $P_i$ supplied thereto. The output of this delay circuit, together with the sequential data words supplied from input terminal 28 are applied to respective inputs of composing circuit 31. The composing circuit, which may function as a multiplexing or interleaving circuit, is adapted to insert, or interleave, the delayed error check words supplied thereto from delay circuit 30 into the sequence of data words. Consistent with the format shown in FIG. 5B, an error check word is inserted after every two data words.

The output of composing circuit 31 is connected to modulator 32 to supply sequential data blocks of the type shown in FIG. 5B thereto. The modulator may be of a conventional type adapted to modulate the digital signals supplied from composing circuit 31 in a desired recording code, such as the aforementioned NRZI, 3PM, MFM, and the like. The output of modulator 32 is connected to an output terminal 33, this output terminal being coupled to record gate 11 (FIG. 1).

Although not shown in FIG. 7, a CRC code generator may be provided between composing circuit 31 and modulator 32 to generate a CRC code and insert same after every predetermined number data blocks.

Error check word generator 29 generates an error check word $P_i$ in response to the two data words $W_i$ and $W_{i+1}$ that are supplied thereto. Thus, error check word $P_1$ is generated in response to data words $W_1$ and $W_2$; error check word $P_3$ is generated in response to data words $W_3$ and $W_4$; and so on. These error check words, which are generated in sequence, are delayed by an amount comparable to d data blocks. Thus, by reason of this delay, when data words $W_1$ and $W_2$ are supplied to input terminal 28, and thus to composing circuit 31, delay circuit 30 supplies the error check word $P_{1-2d}$ to the composing circuit. This error check word is, of course, delayed from the data words with which it is associated. Similarly, when data words $W_{1+2d}$ and $W_{2+2d}$ are received in input terminal 28, delay circuit 30 supplies the error check word $P_1$ to composing circuit 31. These delayed error check words and the received data words are interleaved by the composing circuit to form the sequential arrangement shown in FIG. 5B. This sequence of data blocks, after being suitably modulated in modulator 32, is supplied to record gate 11 for recording on magnetic tape 1 during an edit operation.

Figure 8A:
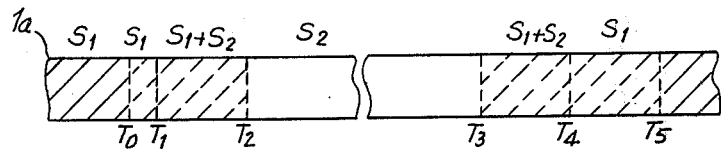
FIGS. 8A and 8B are useful in understanding how the decoder and encoder of FIGS. 6 and 7 operate.
Figure 8B:
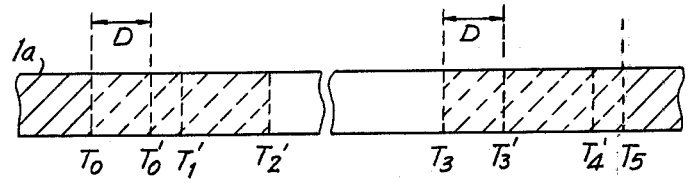

When the apparatus illustrated in FIG. 1 is provided with the decoder shown in FIG. 6 and with the encoder shown in FIG. 7, the digital signals which are recorded on magnetic tape 1 during an edit operation, such as an insert edit operation, have the format shown in FIG. 5B and are schematically represented in FIGS. 8A and 8B. FIG. 8A represents the data words which are recorded in track 1a; and FIG. 8B represents the error check words which are recorded in this track. Locations $T_i$ correspond to those locations discussed above with respect to FIGS. 3 and 4 and depict the locations at which digital signals, which are generated at various times during the edit operation, are recorded. Thus, location $T_0$ corresponds to the time that record gate 11 is actuated. As discussed above, prior to location $T_0$, the originally-recorded digital signals $S_1$ appear on track 1a. From location $T_0$ to location $T_1$, these digital signals are re-recorded. At location $T_1$, editing circuit 8 is energized (as discussed above with respect to FIGS. 2-4), whereupon the mixed digital signals $S_3=S_1+S_2$ are recorded. It is recalled that, during the interval $T_1$-$T_2$, the cross-fade operation is carried out. This cross-fade operation terminates at location $T_2$, whereupon only the edit digital signals $S_2$ are recorded.

From FIG. 5B, it is appreciated that each error check word is recorded in a data block that is delayed, or spaced, from the data block in which its associated data words are recorded. This spacing is equal to d data blocks, and is represented as the spacing D in FIG. 8B. That is, if data words $W_1$ and $W_2$ are recorded at, for example, location $T_0$ in FIG. 8A, the error check word $P_1$ associated with these data words are recorded at a delayed location $T'_0$, this location $T'_0$ being spaced from location $T_0$ by the distance D.

During the interval $T_0$-$T_1$, the mixed digital signals $S_3$ are constituted solely by the originally-recorded digital signals $S_1$. From the foregoing discussion of the operation of the editing apparatus shown in FIG. 1, it is appreciated that, even when the mixed digital signals $S_3$ are produced are recorded, these mixed digital signals contain error check words. In FIG. 8B, during the interval $T'_0$-$T'_1$, the error check words associated with the digital signals ($S_3=S_1$) recorded in interval $T_0$-$T_1$ are recorded. It is seen that the interval $T'_0$-$T'_1$ is spaced from the interval $T_0$-$T_1$ by the distance D.

During the interval $T'_1$-$T'_2$ (FIG. 8B), the error check words associated with the data words included in the mixed digital signals $S_3$ ($S_3=S_1+S_2$) recorded in interval $T_1$-$T_2$ are recorded. Similarly, while the edit digital signals $S_2$ are recorded in interval $T_2$-$T_3$ on track 1a, the error check words associated with these edit digital signals are recorded in interval $T'_2$-$T'_3$. That is, the recorded error check words are delayed, or spaced, from their associated data words by the distance D regardless of whether the data words are the originally-recorded digital signals, the mixed, cross-faded digital signals or the edit digital signals.

Location $T_3$ corresponds to the initiation of the cross-fade operation to carry out a cut-out mode. It is recalled that, during the cut-out mode of operation, the mixed digital signals $S_3$ are constituted by a mixture of the originally-recorded digital signals $S_1$ of progressively increasing value and the edit digital signals $S_2$ of progressively decreasing value. Hence, during the interval $T_3$–$T_4$, the mixed digital signals are represented as $S_3 = S_1 + S_2$. At the commencement of the cut-out mode, that is, at location $T_3$, the error check word included in the digital signals $S_3$ at the output of encoder 10 is associated with an edit digital signal that had been recorded prior to location $T_3$. As shown in FIG. 8B, during the interval $T_3$–$T'_3$, which interval encompasses a length D on track 1a, the error check words which are recorded are associated with data words that had been recorded prior to location $T_3$.

The mixed digital signals $(S_3 = S_1 + S_2)$ are recorded in interval $T_3$–$T_4$, and the error check words associated with the data words of these mixed digital signals are recorded in spaced (or delayed) interval $T'_3$–$T'_4$.

The cross-fade operation terminates at location $T_4$. Hence, in the interval $T_4$–$T_5$, the originally-recorded digital signals $S_1$ are re-recorded. At location $T_5$, the aforedescribed cut-out mode terminates. Thus, from location $T_5$ and thereafter, digital signals $S_1$ are re-corded. The error check words associated with the digital signals $S_1$ are recorded from location $T'_4$ and thereafter, as shown in FIG. 8B.

Thus, it is seen that, even when the format shown in FIG. 5B is used, the editing apparatus of the present invention records the edited data signals, together with their associated check words, as illustrated in FIGS. 8A and 8B. Thus, the present invention carries out an insert edit mode without loss of associated error check words.

In the embodiment of the apparatus thus far described, the data words are recorded in a single channel, or a track. This channel of data words may be recorded in separate, parallel tracks. For example, the odd-numbered data words ($W_1, W_3, \ldots$) may be recorded in one track and the even-numbered data words ($W_2, W_4, \ldots$) may be recorded in the other, parallel track. It will be appreciated that this dual-track technique further minimizes loss of information that may be present due to drop-out or burst error in a single track. One embodiment of editing apparatus which can be used with such dual-track digital signals is illustrated in FIG. 9. This apparatus is comprised of a pair of reproducing transducers 42a and 42b, a pair of playback amplifiers 45a and 45b, a decoder 46, a delay circuit 47, an editing circuit 48, an encoder 50, a pair of record gates 51a and 51b, a pair of record amplifiers 52a and 52b and a pair of recording transducers 43a and 43b. Also provided are a pair of monitoring transducers 44a and 44b connected to respective monitoring amplifiers 55a and 55b, respectively. Decoder 46 is described in greater detail below with respect to FIG. 14 and serves substantially the same function as decoder 6 described above with respect to FIGS. 1 and 6. Decoder 46 is supplied with the digital signals reproduced from the respective tracks on magnetic tape 41 by reproducing transducers 42a and 42b, respectively. As will be described, the decoder also is adapted to combine, or merge, the data words reproduced from the respective tracks into a single channel of data words, this single channel being represented by digital signals $S_1$. For the purpose of the present discussion, the reference character $S_1$ will be used to identify originally-recorded digital signals, which signals are recorded on separate tracks.

Delay circuit 47 is connected to the output of decoder 46 and is adapted to impart a delay of predetermined duration to the originally-recorded digital signals $S_1$. This delay is equivalent to the time required for a point on magnetic tape 41 to be transported from reproducing transducers 42a, 42b to recording transducers 43a, 43b, as described above with respect to the embodiment of FIG. 1. Hence, and as discussed previously, the time required for digital signals $S_1$ to electronically traverse the editing apparatus is identical to the time required for these digital signals to be transported by the magnetic tape from the reproducing site to the recording site.

Editing circuit 48 is connected to delay circuit 47 and also to an input terminal 49. This editing circuit may be substantially the same as aforedescribed editing circuit 8. Thus, editing circuit 48 is adapted to carry out a cross-fade operation to achieve cut-in and cut-out modes. The editing apparatus is adapted to produced mixed digital signals $S_3$ in response to the originally-recorded digital signals $S_1$ supplied thereto and the edit digital signals $S_2$ supplied to input terminal 49 from a suitable source. As in the previously described editing circuit, editing circuit 48 includes a control input to receive start/stop edit control pulses $P_2$ to initiate the respective cross-fade operations. In the interest of brevity, further description of editing circuit 48 is not provided.

Encoder 50 is connected to editing circuit 48 and is adapted to receive the mixed digital signals $S_3$ therefrom. It is recalled that these mixed digital signals may be constituted by the originally-recorded digital signals $S_1$, a mixture of the originally-recorded digital signals $S_1$ and the edit digital signals $S_2$, and by the edit digital signals $S_2$ taken alone. Encoder 50 is adapted to perform a function analogous to that described above with respect to encoder 10, and a more detailed description of encoder 50 is set out hereinbelow with respect to FIG. 13. Hence, the encoder is adapted to generate error check words, to insert such error check words into the data words received from editing circuit 48 so as to form data blocks, and to modulate such data blocks in a suitable recording code. Furthermore, encoder 50 is adapted to distribute the single channel of digital signals supplied thereto into separate sequences of data blocks suitable for recording on the respective parallel tracks of magnetic tape 41.

Record gates 51a and 51b are similar to aforedescribed record gate 11 and are adapted, when actuated, to supply the separate sequences of data blocks provided by encoder 50 to recording transducers 43a and 43b via recording amplifiers 52a and 52b, respectively. Each record gate is adapted to be actuated by a switch control pulse. More particularly, record gate 51a is actuated by switch control pulse $P_{1a}$ and record gate 51b is actuated by switch control pulse $P_{1b}$. The record gates are not actuated concurrently. In the illustrated embodiment, record gate 51a is actuated in advance of record gate 51b. This is attained by delaying switch control pulse $P_{1a}$ as by a delay circuit 54, to form the delayed switch control pulse $P_{1b}$. The purpose of delaying the actuation of one recording gate relative to the other is to ensure that, if switching noise is introduced in response to the actuation of the record gates, such switching noise is not recorded in time alignment on both tracks of magnetic tape 1. The reason for delaying, or dispersing, this recording of switching noise will become apparent from the description set out below.

Control circuit 53, which may be similar to aforedescribed control circuit 13, is adapted to generate the switch control pulse $P_{1a}$ and the start/stop edit control pulse $P_2$. If desired, delay circuit 54 may be incorporated into control circuit 53 such that the control circuit generates both the switch control pulses $P_{1a}$ and the delayed switch control pulse $P_{1b}$.

The manner in which an insert edit operation is carried out by the apparatus of FIG. 9 so as to edit the digital signals recorded on the parallel tracks of magnetic tape 1 now will be described with reference to FIGS. 10 and 11. Let it be assumed that the cut-in operation is initiated at time $t_0$. Hence, at this time the switch control pulse $P_{1a}$ is generated. This switch control pulse actuates record gate 51a such that the sequence of data blocks supplied to this record gate by encoder 50 is recorded onto, for example, track 1a of magnetic tape 41 by recording transducer 43a. FIG. 10A represents the cut-in mode, and it is appreciated that, prior to receiving the start edit control pulse $P_2$, editing circuit 48 merely supplies the originally-recorded digital signals $S_1$, without modification thereto by edit digital signals $S_2$, to encoder 50. Hence, from location $T_0$ to $T_2$ (the latter location corresponding to the time that the start edit control pulse is produced), the originally-recorded digital signals $S_1$ are re-recorded. That is, in the interval $T_0$–$T_2$, the signals supplied to encoder 50, which have been referred to as the mixed digital signals $S_3$, are constituted solely by the originally-recorded digital signals $S_1$ (i.e. $S_3 = S_1$).

Let it further be assumed that, because of delay circuit 54, switch control pulse $P_{1b}$ is not produced until time $t_1$. Thus, from time $t_1$, record gate 51b is actuated to supply the sequence of data blocks received from encoder 50 to recording transducer 43b. This is represented in FIG. 11 as location $T_1$, from which the originally-recorded digital signals $S_1$ are re-recorded on track 1b.

At time $t_2$, the start edit control pulse is produced. Thus, as shown in FIG. 11, in the interval $T_0$–$T_2$, the originally-recorded digital signals $S_1$ are re-recorded on track 1a, and in the interval $T_1$–$T_2$, the originally-recorded digital signals $S_1$ are re-recorded on track 1b. From location $T_2$ on both tracks, that is, from time $t_2$ at which the start edit control pulse $P_2$ is produced, mixed digital signals $S_3 = S_1 + S_2$ are recorded on both tracks. As shown in FIG. 10A, the cross-fade operation is carried out in the time duration $T_2$–$T_3$. This time duration corresponds to the interval $T_2$–$T_3$ on magnetic tape 41. Thus, during this interval, the sequence of data blocks supplied to record gate 51a and the sequence of data blocks supplied to record gate 51b are recorded on tracks 1a and 1b, respectively. It is recalled that, during this cross-fade operation during the cut-in mode, the value of the originally-recorded digital signals $S_1$ is progressively reduced and the value of the edit digital signals $S_2$ is progressively increased. Hence, from location $T_3$, the mixed digital signals $S_3$ which are recorded on the respective tracks are constituted solely by the edit digital signals $S_2$.

Let it be assumed that the cut-out mode is initiated at time $t_4$, as shown in FIG. 10B. This means that, in the interval $T_3$–$T_4$ on both tracks 1a and 1b, the sequences of data words corresponding to edit digital signals $S_2$ are recorded. However, during the cross-fade operation carried out in the cut-out mode from time $t_4$ to $t_5$, the mixed digital signals $S_3$ are recorded on tracks 1a and 1b. As shown in FIG. 11, during interval $T_4$–$T_5$, the mixed digital signals $S_3 = S_1 + S_2$ are recorded. From FIG. 10B, it is recognized that, during this cross-fade operation, the value of the originally-recorded digital signals $S_1$ progressively increases and the value of the edit digital signals $S_2$ progressively decreases. At time $t_5$, that is, at the completion of this cross-fade operation, the mixed digital signals $S_3$ are constituted solely by the originally-recorded digital signals $S_1$. Hence, from location $T_5$, the originally-recorded digital signals $S_1$ are re-recorded in each of tracks 1a 1 and 1b.

The cut-out mode is completed when the switch control pulses $P_{1a}$ and $P_{1b}$ terminate. It is assumed that switch control pulse $P_{1a}$ terminates at time $t_6$ and that switch control pulse $P_{1b}$ terminates at a delayed time thereafter, i.e. at time $t_7$. Thus, as illustrated in FIG. 11, during the interval $T_5$–$T_6$, the originally-recorded digital signals $S_1$ are re-recorded in track 1a until location $T_6$ is reached, whereupon record gate 51a is deactuated. Similarly, the originally-recorded digital signals $S_1$ are re-recorded in track 1b from location $T_5$ to location $T_7$, at which time record gate 51b is deactuated. Of course, upon the deactuation of the respective record gates, the originally-recorded digital signals $S_1$ in the respective tracks are not re-recorded or otherwise modified.

From FIG. 11, it is seen that switching noise may be recorded in track 1a at location $T_0$, the location corresponding to the actuation of record gate 51a. Similarly, switching noise may be recorded in track 1b at location $T_1$ corresponding to the actuation of record gate 51b. These locations are spaced apart from each other and, thus, are not in time-alignment. Therefore, any distortion of the digital signals of track 1a due to this recording noise is not accompanied by distortion of the digital signals in track 1b and, similarly, any distortion in the digital signals in track 1b due to the switching noise that may be recorded in this track is not accompanied by a concurrent distortion in the digital signals recorded in track 1a. Also, when the record gates are deactuated, corresponding to locations $T_6$ and $T_7$, respectively, any distortion in the digital signals in one track due to such deactuation is not accompanied by a concurrent distortion in the digital signals which are recorded in the other track. This means that if a data word in one track is related to a data word aligned therewith in the other track, distortion of the data word in one track will not be accompanied by distortion in the related data word in the other track. Consequently, even though one data word may be distorted, it may, nevertheless, be recovered by using its undistorted related data word in alignment therewith on the other track together with the error check word which is associated with both these data words.

Although not shown in FIG. 9, erase transducers, or heads, may be provided for tracks 1a and 1b, respectively, these erase heads being disposed between the recording and reproducing transducers aligned with such tracks. These erase heads may be energized by switch control pulses $P_{1a}$ and $P_{1b}$, respectively.

Figure 12:
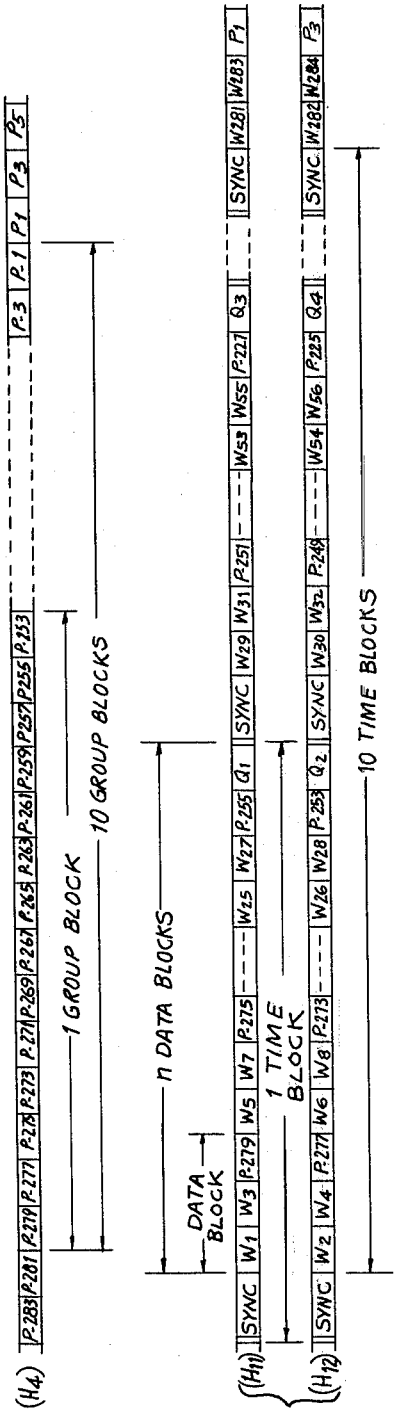
FIGS. 12A–12E represent the data format of the digital signals which are processed by the apparatus of FIG. 9.

A schematic representation of the format in which the digital signals are recorded, and the manner in which such format is obtained, is illustrated in FIGS. 12A–12E. If the channel of data words, prior to recording on magnetic tape 41, is as shown in FIG. 12A, and if it is assumed that data word $W_1$ is related to data word $W_2$, that data word $W_3$ is related to data word $W_4$, and so on, then this channel of data words is recorded as the separate sequences on respective parallel tracks, as illustrated in FIG. 12B. That is, and as an example, the odd-numbered data words $W_1, W_3, \ldots$ are recorded on track 1a and the even-numbered data words $W_2, W_4, \ldots$ are recorded on track 1b. Related data words are recorded in time-alignment with each other. It will be explained that edited digital signals likewise appear in the dual sequences represented in FIG. 12B. It is appreciated that, by delaying the actuation of record gates 51a and 51b, switching noise that might distort a data word in one track, for example, data word $W_1$, will not be accompanied by switching noise that will distort the aligned, related data word $W_2$ in the other track.

Figure 13:
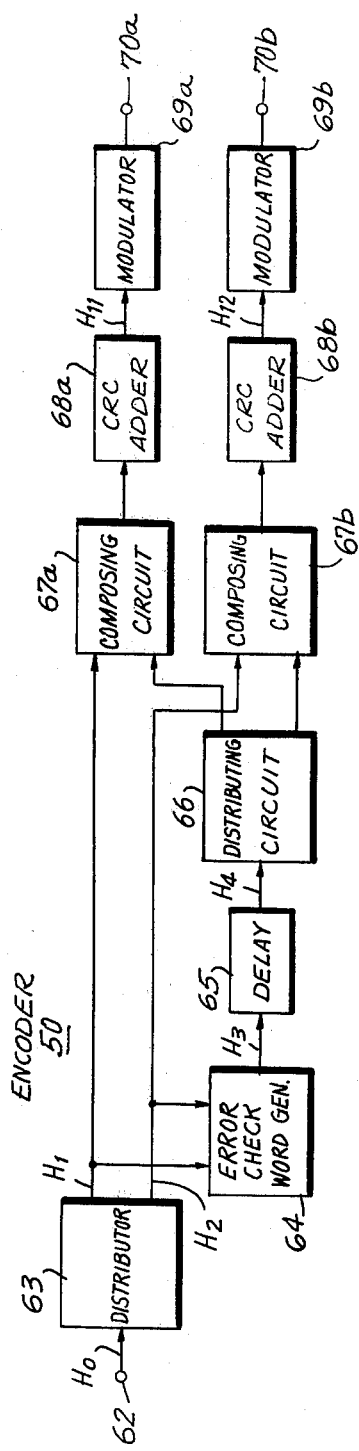
FIG. 13 is a block diagram of encoder apparatus which can be used in the embodiment of FIG. 9.
Figure 14:
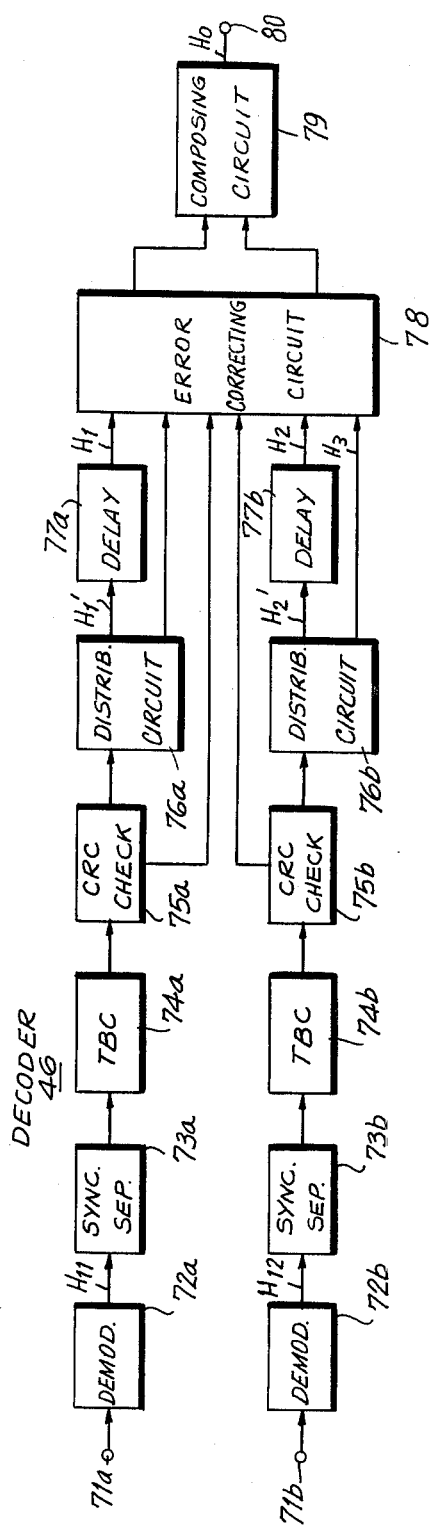
FIG. 14 is a block diagram of decoder apparatus which can be used in the embodiment of FIG. 9.

The recording format shown in FIGS. 12A–12D, and particularly the recording format shown in FIG. 12E, is implemented by encoder 50 and also by decoder 46, particular embodiments of which are illustrated in FIGS. 13 and 14, respectively. Encoder 50 is comprised of a distributing circuit 63, an error check word generator 64, a delay circuit 65, a distributing circuit 66, composing circuits 67a, 67b and modulators 69a, 69b. Distributing circuit 63 is connected to an input terminal 62 to receive a channel of data words $H_0$. These data words may be thought of as being constituted by a sequence of data words $W_1$, $W_2$, and so on. The distributing circuit is adapted to demultiplex, or separate these sequential data words into separate sequences. For example, distributing circuit 63 may separate the data words into a sequence of odd-numbered data words $W_1$, $W_3$, ... and into a sequence of even-numbered data words $W_2$, $W_4$, .... The distributing circuit is provided with a pair of outputs at which these respective sequences of separated data words are obtained.

The outputs of distributing circuit 63 are coupled to error check word generator 64 and also to respective ones of composing circuits 67a and 67b. Error check word generator 64 may be similar to aforedescribed error check word generator 29 and is adapted to generate an error check word in response to associated data words supplied thereto. As one example, the error check word generator may be capable of generating a full adding code so as to produce the error check word $P_i$, wherein $P_i = W_i + W_{i+1}$. Thus, when distributing circuit 63 provides the related data words $W_1$ and $W_2$ at its respective outputs, error check word generator 64 generates the associated error check word $P_1$. When the distributing circuit provides the data words $W_3$ and $W_4$ at its respective outputs, error check word generator 64 generates the error check word $P_3$. Thus, as sequential data words are provided at the outputs of distributing circuit 63, associated error check words are produced sequentially by the error check word generator.

Delay circuit 65 is coupled to the output of error check word generator 64 and may be similar to delay circuit 30, described hereinabove with respect to FIG. 7. Thus, delay circuit 65 is adapted to delay the sequential error check words by a time delay corresponding to d blocks, as will be described below. The output of delay circuit 65 is coupled to a distributing, or a separating circuit 66. This distributing circuit may be similar to distributing circuit 63 and is provided with two outputs. Distributing circuit 66 is adapted to provide alternate error check words at its two outputs. For example, if this distributing circuit is supplied with sequential error check words $P_1$, $P_3$, $P_5$, ..., then error check word $P_1$ is provided at one output, error check word $P_3$ is provided at the other output, error check word $P_5$ is provided at the first-mentioned output, and so on. Thus, sequences of alternating error check words are obtained at the two outputs of distributing circuit 66.

Composing circuit 67a is connected to an output of distributing circuit 63 and an output of distributing circuit 66. Composing circuit 67b is connected to the other output of each of distributing circuits 63 and 66. Each composing circuit may be similar to aforedescribed composing circuit 31 and is adapted to interleave, or multiplex, the error check words provided by distributing circuit 66 and the sequence of data words provided by distributing circuit 63. These interleaved words form data blocks for recording on tracks 1a and 1b, respectively. The output of composing circuit 67a is coupled to modulator 69a via an adding circuit 68a. The output of composing circuit 67b is coupled to modulator 69b via an adding circuit 68b. Each of these adding circuits is adapted to insert a CRC code and a synchronizing signal code into the sequences of data blocks supplied thereto. Circuitry which is adapted to function as adding circuits 68a and 68b is described in aforementioned U.S. application Ser. No. 905,894. Modulators 69a and 69b may be similar to modulator 32, described above with respect to FIG. 7, for modulating the digital signals supplied thereto from adding circuits 68a and 68b to an appropriate recording code.

The manner in which encoder 50 operates now will be described with reference to FIGS. 12A–12E. Let it be assumed that the channel of data words supplied to distributing circuit 63 is as represented by channel $H_0$ in FIG. 12A. The distributing circuit separates the sequential data words into a sequence of odd-numbered daa words $H_1$ and into a sequence of even-numbered data words $H_2$, illustrated in FIG. 12D. These odd and even sequences are supplied to error check word generator 64. The error check word generator generates an error check word in response to the data words which are supplied thereto concurrently. Thus, and as represented in FIG. 12C, error check word $P_1$ is generated in response to data words $W_1$ and $W_2$ which are supplied concurrently to error check word generator 64 by distributing circuit 63. Error check word $P_3$ is generated in response to data words $W_3$ and $W_4$, error check word $P_5$ is generated in response to data words $W_5$ and $W_6$, and so on. Thus, it is seen that error check generator 64 generates the sequence of error check words $H_3$ shown in FIG. 12C. Of course, it is recognized that each error check word in this sequence $H_3$ is associated with a pair of data words that are in time alignment in data word sequences $H_1$ and $H_2$.

The sequence $H_3$ of error check words is delayed by delay circuit 65. If it is assumed that, for example, fourteen sequential data words constitute one group or group block of data words, then delay circuit 65 imparts a delay corresponding to ten group blocks. The delayed error check words produced by delay circuit 65 are represented as delay sequence $H_4$ in FIG. 12D. It is seen that the time of occurrence of error check work $P_1$ is delayed by ten group blocks from its associated data words $W_1$ and $W_2$. Hence, in delayed sequence $H_4$, error check word $P_{-279}$ is in time-alignment with data words $W_1$ and $W_2$, error check word $P_{-277}$ is in time-alignment with data words $W_3$ and $W_4$, error check word $P_{-275}$ is in time-alignment with data words $W_5$ and $W_6$, and so on.

Distributing circuit 66 distributes the sequential, delayed error check words, included in sequence $H_4$, to composing circuits 67a and 67b. That is, error check word $P_{-279}$ is supplied to composing circuit 67a while error check word $P_{-277}$ is supplied to composing circuit 67b. That is, distributing circuit 66 distributes, or separates, alternate error check words to composing circuits 67a and 67b, respectively.

Composing circuit 67a inserts an error check word supplied thereto by distributing circuit 66 after every two data words supplied thereto by distributing circuit 63. Composing circuit 67b functions in a similar manner. Thus, as shown in FIG. 12E, composing circuit 67a inserts error check word $P_{-279}$ following sequential data words $W_1$ and $W_3$; and composing circuit 67b inserts error check word $P_{-277}$ following sequential data words $W_2$ and $W_4$. Similarly, the next error check word $P_{-275}$ supplied to composing circuit 67a is inserted following sequential data words $W_5$ and $W_7$; and composing circuit 67b inserts the next received error check word $P_{-273}$ following sequential data words $W_6$ and $W_8$. Thus, each composing circuit produces sequential data blocks from the data and error check words supplied thereto, each data block being formed of two data words followed by an error check word.

By reason of delay circuit 65, it is seen, from FIG. 12E, that error check word $P_1$ is spaced from the data block in which its associated data word $W_1$ is recorded by m data blocks. Similarly, error check word $P_3$ is contained in a data block that is spaced from the data block in which its associated data word $W_4$ is contained by m data blocks.

The sequences of data blocks produced by composing circuits 67a and 67b are supplied to adding circuits 68a and 68b wherein synchronizing signal codes and CRC codes are inserted, or interleaved. Thus, adding circuits 68a and 68b produce sequences $H_{11}$ and $H_{12}$, these sequences being shown in FIG. 12E as including the synchronizing signal code SYNC and the CRC code $Q_i$. In the illustrated format, the SYNC code is followed by n data blocks followed, in turn, by the CRC code $Q_i$. If it is assumed that a "time block" is defined by successive SYNC codes, then an error check word is spaced from the data word associated therewith by ten time blocks. It is seen, therefore, that one group block is composed, by each of the composing and adding circuits, into one corresponding time block.

Time block sequences $H_{11}$ and $H_{12}$ are modulated by modulators 69a and 69b, respectively, and supplied to record gates 51a and 51b. These sequences $H_{11}$ and $H_{12}$ are recorded in tracks 1a and 1b when record gates 51a and 51b are actuated. As mentioned above, since record gate 51b is actuated at a time delayed from the time that record gate 51a is actuated, any switching noise which may distort one or more data or error check words in sequence $H_{11}$ is not accompanied by distortion of time-aligned data or error check words in sequence $H_{12}$. For example, if data word $W_1$ is distorted, data word $W_2$ is not. Furthermore, since the error check word $P_1$ associated with data words $W_1$ and $W_2$ is contained in a time-separated data block, it will not be distorted and, therefore, may be used with undistorted data word $W_2$ to recover data word $W_1$ (e.g. $W_1 = P_1 - W_2$).

It is appreciated that the input sequence of data words $H_0$ supplied to distributing circuit 63 corresponds to mixed digital signals $S_3$ produced by editing circuit 48 (FIG. 9). Of course, from the foregoing discussion, it is recognized that at the start of a cut-in operation, $S_3 = S_1$; during the following cross-fade operation, $S_3 = S_1 + S_2$; at the completion of the cut-in operation, $S_3 = S_2$; at the beginning of the cross-fade operation of the cut-out mode, $S_3 = S_1 + S_2$; and at the completion of this cross-fade operation, $S_3 = S_1$.

One embodiment of decoder 46 that may be used to recover the originally-recorded digital signals $S_1$ from tracks 1a and 1b is illustrated in FIG. 14. It is assumed that the digital signals which are decoded by decoder 46 are of the type represented by sequences $H_{11}$ and $H_{12}$ in FIG. 12E. That is, sequence $H_{11}$ is reproduced from, for example, track 1a by reproducing transducer 42a and sequence $H_{12}$ is reproduced from track 1b by reproducing transducer 42b.

Decoder 46 is comprised of a pair of demodulators 72a, 72b, a pair of synchronizing code separators 73a, 73b, a pair of time base correcting circuits 74a, 74b, a pair of CRC code check circuits 75a, 75b, a pair of distributing circuits 76a, 76b, a pair of delay circuits 77a, 77b, an error correcting circuit 78 and a composing circuit 79. Demodulators 72a and 72b may be similar to aforedescribed demodulator 22 and are connected to input terminals 71a, 71b to receive the originally-recorded digital signals which are reproduced from magnetic tape 41 by reproducing transducers 42a and 42b, respectively. The demodulators are adapted to demodulate the received digital signals from their particular recording codes to, for example, a binary code. The outputs of demodulators 72a, 72b are connected to synchronizing code separators 73a, 73b. These synchronizing code separators are adapted to separate, or delete, the SYNC code that is recorded in sequences $H_{11}$ and $H_{12}$. The sequences, with the SYNC codes deleted, are supplied to time base correcting circuits 74a, 74b for correction of time base errors that may be present in the reproduced digital signals. These time base correcting circuits may be similar to time base correcting circuit 23.

The time-base corrected sequences of data words derived from time base correcting circuits 74a and 74b are supplied to CRC code check circuits 75a and 75b, respectively. CRC code check circuits 75a and 75b may perform the function described in aforementioned co-pending application Ser. No. 905,894. That is, these CRC code check circuits are adapted to determine whether a time block of data and error check words is erroneous. If so, predetermined error signals are produced by the CRC code check circuits, these error signals being supplied to error correcting circuit 78 for effecting an error correction operation. Since the CRC code check circuits and error correcting circuits form no part of the present invention per se, and since these circuits are known to those of ordinary skill in the art, further description thereof is not provided.

Distributing circuits 76a and 76b are connected to the outputs of CRC code check circuits 75a and 75b to receive the sequences of data blocks from these CRC code check circuits. Each distributing circuit may be similar to distributing circuit 24 (FIG. 6) and is adapted to separate, or demultiplex, the error check words from the data words. Thus, one output of each of the distributing circuits is provided with separated data words and the other output thereof is provided with the separated error check words. It is, of course, appreciated that the separated error check word is not associated with the instantaneous data words which then are being separated. Rather, the error check word is associated with the data word that had been separated at a prior time. In order to bring such previously separated data words into time-alignment with the error check word then being separated, the data words separated by distributing circuits 76a and 76b are applied to delay circuits 77a and 77b, respectively. These delay circuits impart time delays to the separated sequences of data words, which time delays are equal to the delay imparted by delay circuit 65 (FIG. 13). Such time delays correspond to ten group blocks, as discussed above with respect to FIGS. 12C and 12D.

The delayed sequences of data signals produced by delay circuits 77a and 77b, together with the error check words then being separated by distributing circuits 76a and 76b, together with the error signals produced by CRC code check circuits 75a and 75b all are supplied to error correcting circuit 78. This error correcting circuit is adapted to correct an erroneous data word in response to the error check words and error signals which are supplied thereto. Thus, error correcting circuit 78 serves to recover the original data words that were recorded on magnetic tape 41.

Composing circuit 79 serves to interleave, or multiplex, the error-corrected sequences of data words supplied thereto by error correcting circuit 78. That is, the composing circuit, which may be similar to aforedescribed composing circuits 67a and 67b, functions to re-form a single channel of error-corrected data words, which data words had been recorded in parallel tracks 1a and 1b on the magnetic tape.

In operation, the digital signals recorded on tracks 1a and 1b are reproduced by reproducing transducers 42a, 42b, amplified by playback amplifiers 45a, 45b and supplied to demodulators 72a, 72b, via input terminals 71a and 71b, respectively. The recording code which had been used for recording these digital signals is demodulated, whereby demodulators 72a and 72b produce the sequences $H_{11}$ and $H_{12}$, shown in FIG. 12E. Each sequence is formed of successive time blocks, each time block being provided with the SYNC code, followed by n data blocks, followed by the CRC code $Q_i$. Synchronizing code separaters 73a and 73b separate the SYNC codes from sequences $H_{11}$ and $H_{12}$; and time base correcting circuits 74a and 74b correct time base errors which may have been introduced into these reproduced digital signals. Then, the CRC codes $Q_i$ in each sequence are checked in CRC code check circuits 75a and 75b to determine whether the data and error check words included in each time block contain errors. Error signals representing this CRC code check operation are supplied to error correcting circuit 78.

CRC code check circuits 75a and 75b also may delete the CRC code words $Q_i$ from each time block, resulting in successive data blocks supplied to each of distributing circuits 76a and 76b.

Distributing circuit 76a separates the data and error check words included in each sequential data block into successive data words $H'_1$ and successive error check words $H_3$. Similarly, distributing circuit 76b separates the data and error check words from each successive data block received from CRC code check circuit 75b to produce successive data words $H'_2$ and successive error check words $H_3$. The relationship between the separated data and error check words may be similar to that represented by FIGS. 12B and 12D. That is, the successive error check words which are separated by each distributing circuit are associated with data words that had been separated from the tenth preceeding group block. To bring the separated data words into time alignment with their associated error check words, delay circuits 77a and 77b impart delays corresponding to ten group blocks to the successive data words. Thus, error correcting circuit 78 is supplied with time-aligned data and error check words. More particularly, the error correcting circuit is supplied with a sequence of data words corresponding to the sequence $H_1$ of FIG. 12B and the sequence $H_3$ of error check words. Also the error correcting circuit is supplied with the sequence $H_2$ of data words, shown in FIG. 12B, and the time-aligned sequence $H_3$ of associated error check words. It is appreciated that, for example, the error correcting circuit is supplied with data word $W_1$ and data word $W_2$, along with error check word $P_1$ in sequences $H_1$, $H_2$ and $H_3$, respectively, these words being supplied in time-alignment with each other. Similarly, the error correcting circuit is supplied with data word $W_3$ in sequence $H_1$, data word $W_4$ in sequence $H_2$ and error check word $P_3$ in sequence $H_3$, all in time-alignment with each other. Based upon these data and error check words, together with the error signals supplied from CRC code check circuits 75a and 75b, errors that may be present in the data words are corrected. For example, if data word $W_1$ is erroneous, the correct data word may be recovered by performing the error-correcting operation $W_1 = P_1 - W_2$.

The error-corrected data words in sequences $H_1$ and $H_2$, produced by error correcting circuit 78, are merged, or interleaved, by composing circuit 79. This composing circuit thus reproduces the original channel, or single stream, of data words $H_0$, shown in FIG. 12A.

Figure 15:
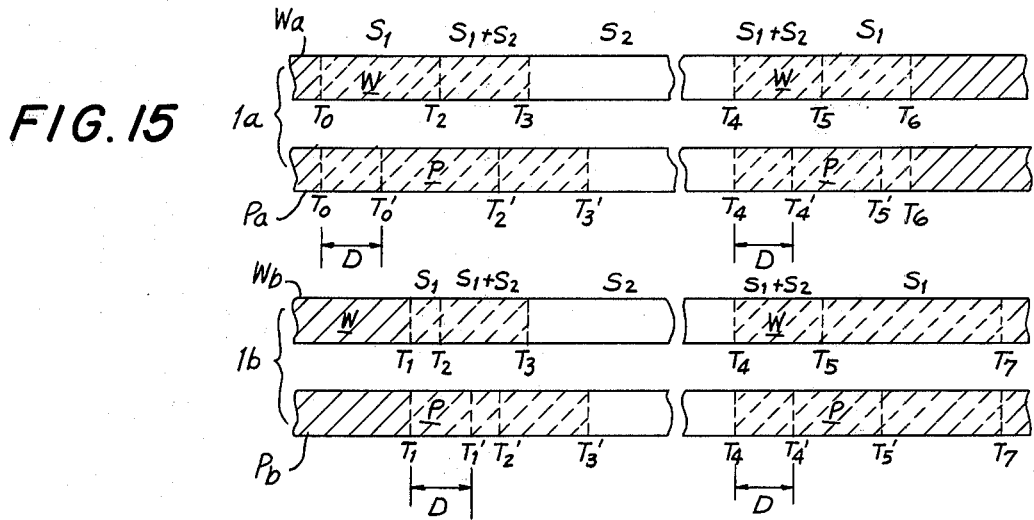
FIG. 15 is useful in understanding how the encoder and decoder of FIGS. 13 and 14 operate.

FIG. 15 is a schematic representation of the sequential data words and sequential error check words which are recorded in tracks 1a and 1b of magnetic tape 41. It is appreciated that an error check word $P_i$ is separated from its associated data word $W_i$ (or $W_i+1$) by an amount corresponding to ten group blocks. This amount is represented by the distance D shown in FIG. 15. In order to simplify an understanding of the recording of the data and error check words, each track is represented as an upper track in which the data words are recorded and a lower track in which the error check words are recorded. Of course, it is appreciated that, in practice, the upper and lower tracks are, in fact, one track in which both data and error check words are recorded. Thus, FIG. 15 appears as a combination of FIGS. 8 and 11.

FIG. 15 represents an insert edit mode wherein edit digital signals $S_2$ are inserted in tracks 1a and 1b between two segments of originally-recorded digital signals $S_1$. It is assumed that the locations $T_i$ on tracks 1a and 1b of FIG. 15 represent the locations in which signals are recorded at times corresponding to times $t_i$ of FIG. 10. Accordingly, at time $t_0$, switch control pulse $P_{1a}$ is produced to actuate switch 51a, that is, to turn this switch ON so as to enable the recording on track 1a of the digital signals then supplied to this switch from output terminal 70a (FIG. 13) of encoder 50. It is recalled that, at this time $t_0$, editing circuit 48 is not yet actuated or energized, and, therefore, the signals supplied to record switch 51a are the originally-recorded digital signals $S_1$ which now are re-recorded on track 1a. This re-recording of the originally-recorded digital signals $S_1$ continues until the editing circuit is energized at time $t_2$. Thus, as shown in FIG. 15, the originally-recorded digital signals $S_1$ are re-recorded on track 1a from location $T_0$ (corresponding to time $t_0$) to location $T_2$ (corresponding to time $t_2$).

It is recalled that the error check words $P_i$ which are associated with the data words which are recorded in track 1a are located in data blocks which are spaced from the data blocks in which its associated data word is contained by m data blocks. This separation between the data blocks containing the data word and its associated error check word is represented by the distance D in FIG. 15. That is, if it is assumed that, at location $T_0$, data word $W_1$ is recorded in track $1a$, then at location $T'_0$, spaced from location $T_0$ by the distance D, the error check word $P_1$ associated with this data word $W_1$ is recorded. Error check words which are recorded in the interval $T_0$-$T'_0$ are associated with data words that are recorded in a comparable interval upstream from location $T_0$.

At time $T_1$, switch control pulse $P_{1b}$ is supplied to record switch $51b$ to actuate or turn ON this record switch. Hence, at this time, the digital signals supplied to record switch $51b$ from output terminal $70b$ of encoder 50 (FIG. 13) are recorded on track $1b$. From FIG. 15, it is seen that location $T_1$ on track $1b$ corresponds to time $t_1$, whereupon the originally-recorded digital signals $S_1$ from track $1b$ are re-recorded thereon. If location $T_2$ corresponds to the time at which editing circuit 48 is actuated, or energized, then the originally-recorded digital signals $S_1$ are re-recorded in track $1b$ during the interval $T_1$-$T_2$. Prior to location $P_1$, that is, prior to the actuation of record switch $51b$, no signals are re-recorded in track $1b$. This is represented by the solid hatched lines which end at location $T_1$, the location at which re-recording commences.

The error check words $P_i$ recorded in track $1b$ are spaced from their associated data words in the same manner discussed above with respect to track $1a$. Thus, the data word, for example $W_4$, recorded at location $T_1$ has its associated error check word $P_3$ recorded at location $T'_1$, the latter location being spaced from location $T_1$ by the distance D. The error check words recorded in the interval $T_1$-$T'_1$ in track $1b$ are associated with the data words which are recorded in an equal interval upstream from location $T_1$. The error check words which are recorded in the interval $T'_1$-$T'_2$ are associated with the data words which are recorded in the interval $T_1$-$T_2$.

At time $t_2$, edit circuit 48 is actuated to initiate the cross-fade operation. This cross-fade operation is carried out during the time interval $t_2$-$t_3$. Thus, mixed signals $S_3=S_1+S_2$ are recorded in the interval $T_2$-$T_3$ on tracks $1a$ and $1b$, respectively. Of course, the error check words which are associated with the data words that are recorded in this interval are recorded in the delayed interval $T'_2$-$T'_3$.

At time $T_3$, the cross-fade operation is completed and the mixed digital signals $S_3$ now are constituted solely by the edit signals $S_2$. Hence, from location $T_3$ onward, the edit digital signals $S_2$ are recorded in tracks $1a$ and $1b$ respectively. The error check word which is associated with the data word recorded at location $T_3$ is recorded at the delayed location $T'_3$, as shown in FIG. 15.

Let it be assumed that, at time $t_4$, the cross-fade operation for the cut-out mode is initiated. This cross-fade operation is carried out in the interval $t_4$-$t_5$. Hence, in the corresponding interval $T_4$-$T_5$ on tracks $1a$ and $1b$, the mixed digital signals $S_3$ produced during this cross-fade operation are recorded. That is, in the interval $T_4$-$T_5$, the mixed digital signals $S_3=S_1+S_2$ are recorded in respective tracks $1a$ and $1b$. The error check words which are associated with these data words are recorded in the delayed interval $T'_4$-$T'_5$ in both tracks.

At time $t_5$, the cross-fade operation is completed. At time $t_6$, record switch $51a$ is deactuated, or turned OFF; and at the later time $t_7$, record switch $51b$ is turned OFF. Thus, in track $1a$, during the interval $T_5$-$T_6$ (corresponding to the time interval $t_5$-$t_6$), the originally-recorded digital signals $S_1$ are re-recorded. In track $1b$, during the interval $T_5$-$T_7$ (corresponding to the time interval $t_5$-$t_7$) the originally-recorded digital signals $S_1$ are re-recorded. It is appreciated that the error check words associated with the data words which are recorded in the interval $T_5$-$T_6$ are recorded in a delayed interval commencing with the location $T'_5$ in track $1a$. Similarly, the error check words associated with the re-recorded data words in the interval $T_5$-$T_7$ are re-recorded in the interval commencing with location $T'_5$ in track $1b$.

It is appreciated that, by delaying the initiation of the cross-fade operation of the cut-in mode following the actuation of record gates $51a$ and $51b$, there is no loss in the error check words which are associated with the originally-recorded digital signals $S_1$. Similarly, by delaying the deactuation of these record gates following the completion of the cross-fade operation of the cut-out mode, there is no loss in the error check words which are associated with the mixed digital signals $S_3=S_1+S_2$.

In the foregoing discussion, it is recognized that the distance D on record tracks $1a$ and $1b$ corresponds to the delay imparted to the error check words in sequence $H_3$ by delay circuit 65 (FIG. 13). In the example represented by FIGS. 12A–12E, this delay is equal to m data blocks, or 10 group blocks, wherein each group block is formed of seven data blocks.

It is seen that the cross-fade operation is carried out in time coincidence on both of tracks $1a$ and $1b$. Furthermore, the edit signals $S_2$ recorded on both of these tracks also are recorded in time coincidence. However, the commencement of the edit operation in track $1a$ occurs at location $T_0$ and the commencement of the edit operation in track $1b$ occurs at location $T_1$. Hence, switching noise that might be associated with the commencement of the edit operation is recorded at different locations on the respective track. Hence, if data or error check words are distorted because of such switching noise, this distortion is dispersed between the two tracks, whereby related data words or associated error check words are not distorted. Similarly, the termination of the edit operation occurs at different locations $T_6$ and $T_7$ on tracks $1a$ and $1b$ so as to disperse switching noise which may be recorded during such termination. Therefore, by this dispersement of switching noise in the two record tracks, the possibility of non-recoverable errors in the data and error check words is minimized.

Figure 16:
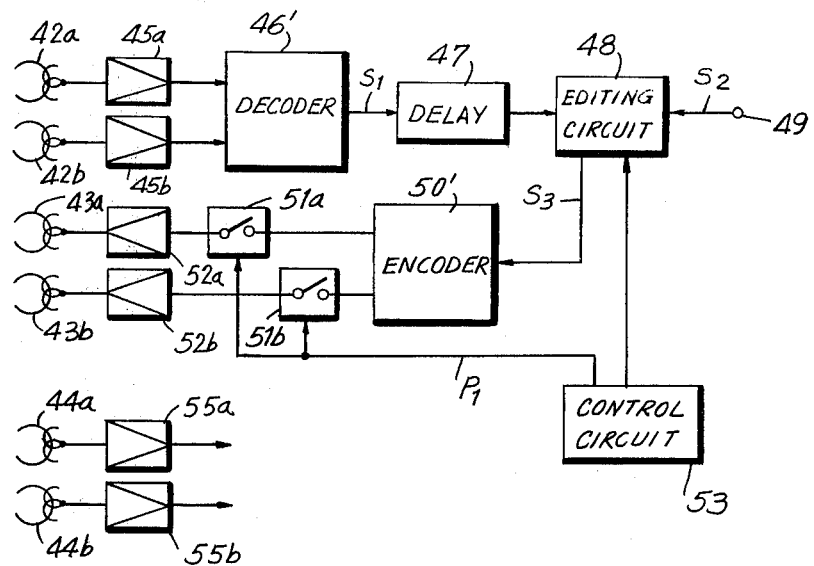
FIG. 16 is a block diagram of yet another embodiment of editing apparatus in accordance with the present invention.

Another embodiment for dispersing errors or distortions in the data and error check words recorded in dual parallel tracks so as to minimize distortion in the recorded information now will be described with reference to FIGS. 16–20. The apparatus of FIG. 16 is similar to that described hereinabove with respect to FIG. 9, and like components are identified with the same reference numerals. The embodiment of FIG. 16 differs from that of FIG. 9 in the construction of decoder $46'$, the construction of encoder $50'$, and the omission of delay circuit 54. Thus, in the embodiment of FIG. 16, record gates $51a$ and $51b$ both are actuated, or turned ON and OFF in time coincidence by the switch control pulse $P_1$ supplied thereto by control circuit 53. In the interest of brevity, and since further description of the embodiment shown in FIG. 16 would be redundant, such further description is omitted. A detailed description of decoder $46'$ and encoder $50'$ are set out hereinbelow.

The format in which the digital signals are recorded on the magnetic tape processed by the embodiment shown in FIG. 16 differs from the format of the digital signals which are processed by the embodiment of FIG. 9. More particularly, the data blocks in track 1b which contain data words related to the data words contained in the data blocks recorded in track 1a are spaced or delayed, therefrom. For example, and with reference to FIG. 19B, although data words $W_1$ and $W_2$ are related to each other, the data block in which data word $W_1$ is recorded in track 1a is spaced from the data block in which data word $W_2$ is recorded in track 1b. This delay, or spaced apart relationship, is illustrated in FIGS. 19E and 19F. If is it assumed that the sequence $H_{12}$ (FIG. 19E) is recorded in track 1b, then the sequence $H_{21}$ (FIG. 19F) is recorded in track 1a. It is seen, from these schematic representations, that data word $W_1$, although related to data word $W_2$, is spaced therefrom by a number q of data blocks. Whereas data words $W_1$ and $W_2$ are recorded in time-aligned data blocks in the previously described embodiments, the data blocks in which these data words are contained are not recorded with such time-alignment in the presently described embodiment.

Figure 17:
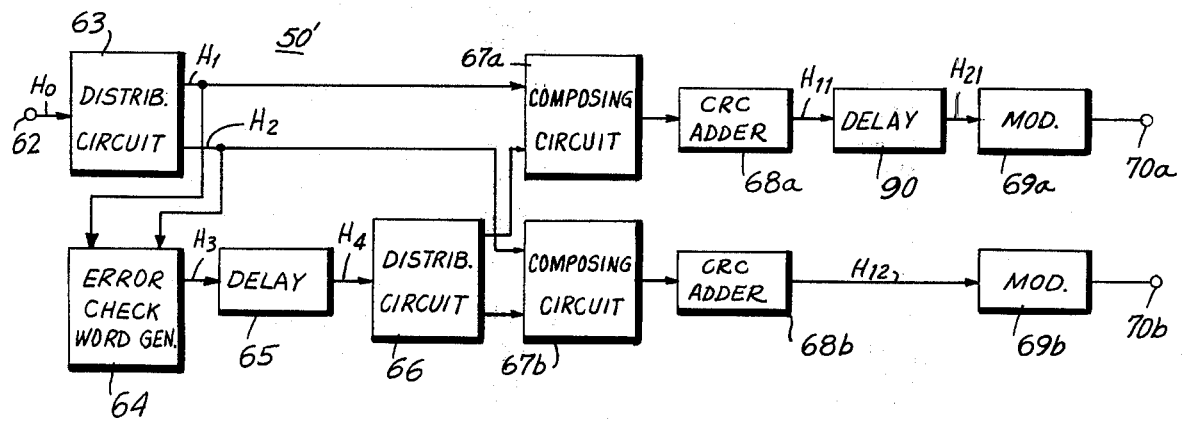
FIG. 17 is a block diagram of encoder apparatus which may be used with the embodiment of FIG. 16.

One example of encoder 50' which may be used to arrange the mixed digital signals $S_3$ in the recording format shown in FIG. 19 is illustrated in FIG. 17. The embodiment illustrated in FIG. 17 is similar to that shown in FIG. 13, except that in the presently described embodiment, a delay circuit 90 is connected between adding circuit 68a and modulator 69a. This delay circuit is adapted to impart a delay equal to q data blocks which, for example, may constitute five time blocks (FIG. 19F), each time block containing seven data blocks.

The remaining elements shown in FIG. 17, that is, distributing circuit 63, error check word generator 64, delay circuit 65, distributing circuit 66, composing circuits 67a, 67b, adding circuit 68a, 68b and modulators 69a and 69b are the same as the corresponding elements described previously with respect to FIG. 13. Thus, in the interest of brevity, further description thereof is not provided.

Figure 19A:
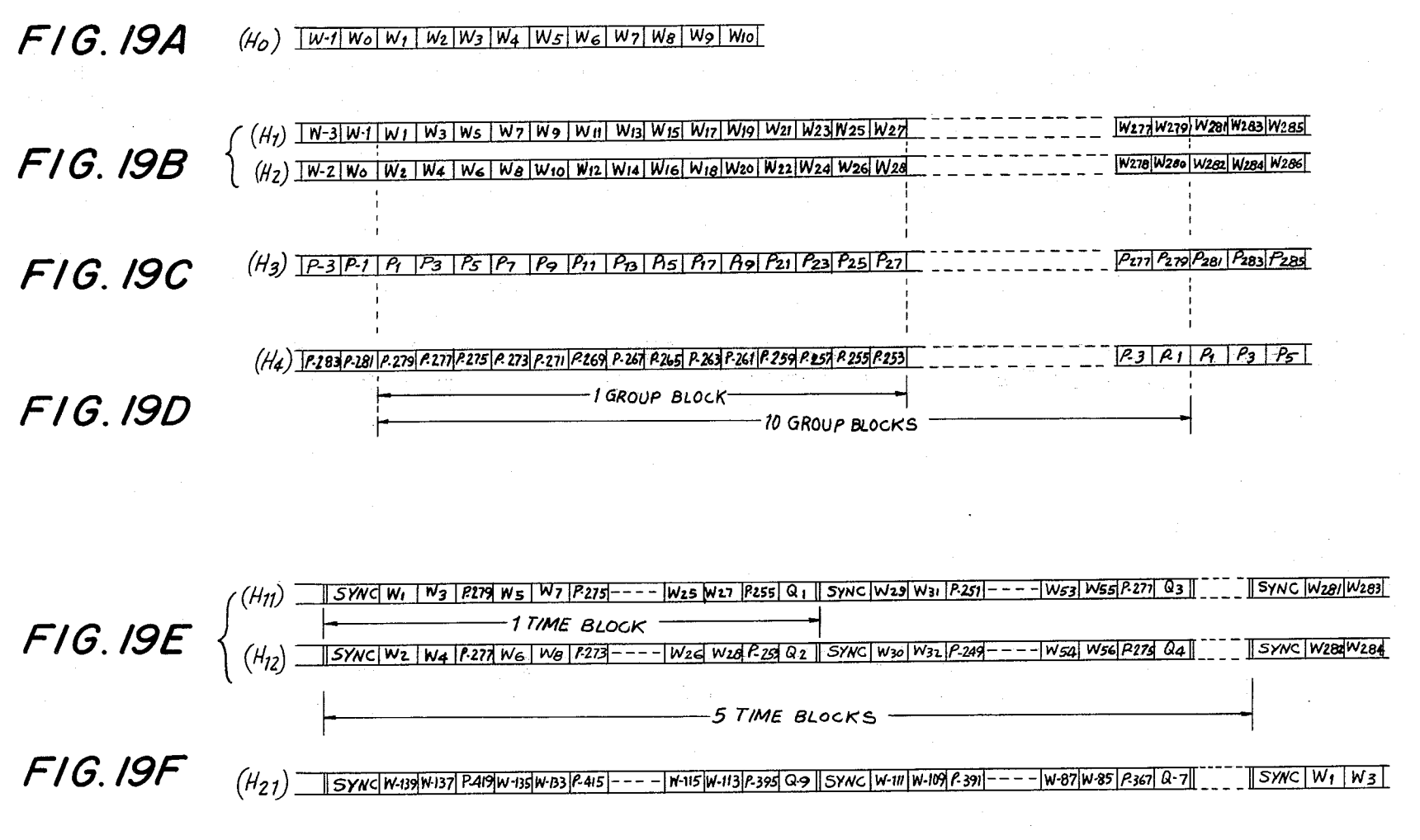

In operation, the mixed digital signals $S_3$ produced by edit circuit 48 are supplied as sequence $H_0$ (FIG. 19A) to distributing circuit 63. The successive data words $W_1, W_2, W_3, \ldots$ included in sequence $H_0$ are separated into sequences $H_1$ and $H_2$, respectively. As shown in FIG. 19B, the odd-numbered data words are disposed in sequence $H_1$ and the even-numbered data words are disposed in sequence $H_2$. Related data words (i.e. $W_1$ and $W_2$, $W_3$ and $W_4$, and so on) are in time-alignment with each other.

Sequences $H_1$ and $H_2$ are supplied to error check word generator 64 which generates sequential error check words $P_1, P_3, P_5, \ldots$ constituting seqence $H_3$. Each error check word is a full adding code word, such that $P_i = W_i + W_{i+1}$. Hence, as shown in FIG. 19C, each error check word is in time-alignment with its associated data word.

The sequence $H_3$ of error check words is delayed by m data blocks in delay circuit 65. As shown in FIG. 19D, this delay of m data blocks is equivalent to ten group blocks, wherein each group block is formed of 14 successive odd-numbered or even-numbered data words. Recalling that two successive data words are included in a data block, thereby forming data blocks constituted by data words $W_1$ and $W_3$, $W_5$ and $W_7$, and so on, one group block, as shown in FIG. 19, is equal to seven data blocks. The delayed sequence of error check words comprises sequence $H_4$ (FIG. 19), and alternate ones of these delayed error check words are inserted after every two data words in sequences $H_1$ and $H_2$. Thus, distributing circuit 66 supplies alternate ones of the error check words included in sequence $H_4$ to composing circuit 67a, and the remaining error check words to composing circuit 67b. The respective composing circuits interleave the data and error check words supplied thereto. Thus, composing circuit 67a forms the sequence of data blocks which appear as $W_1, W_3, P_{-279}; W_5, W_7, P_{-275}; \ldots W_{281}, W_{283}, P_1$; and the like. Composing circuit 67a thus forms data blocks constituted by odd-numbered data words and interleaved error check words, wherein each interleaved error check word is associated with data words that has been presented m data blocks ago. In a similar manner, composing circuit 67b forms data blocks of the even-numbered data words and interleaved error check words, resulting in data blocks $W_2, W_4, P_{-277}; W_6, W_8, P_{-273}; \ldots W_{282}, W_{284}, P_3$; and the like.

The respective sequences of data blocks produced by composing circuits 67a and 67b are supplied to adding circuits 68a and 68b, respectively, wherein SYNC code words and CRC code words are inserted, as shown in FIG. 19E. Adding circuit 68a thus produces the sequence $H_{11}$ formed of successive group blocks, each group block being formed of the SYNC code word followed by n data blocks, followed by the CRC code word $Q_i$. Similarly, adding circuit 68b produces the sequence $H_{12}$. It is seen from FIG. 19E, that related data words in the respective data blocks of sequences $H_{11}$ and $H_{12}$ are in time-alignment with each other. Of course, the error check word in each data block is associated with time-aligned related data words in sequences $H_{11}$ and $H_{12}$ that are spaced from the data block containing that error check word.

It is recalled that sequences $H_{11}$ and $H_{12}$, substantially as shown in FIG. 19E, are recorded by the apparatus of FIG. 9. However, in the presently described embodiment, sequence $H_{11}$ is delayed by delay circuit 90 before being supplied to modulator 69a. The delayed sequence $H_{21}$ is shown in FIG. 19F. Delay circuit 90 imparts a time delay to sequence $H_{11}$ comparable to q data blocks. If it is assumed that a time block is defined by successive SYNC words (FIG. 19E), then the time delay imparted by delay circuit 90 is equal to, for example 5 time blocks. The delayed sequence $H_{21}$ of time blocks and the undelayed sequence $H_{12}$ are modulated to a suitable recording modulation format by modulators 69a and 69b, and these modulated sequences are supplied to recording transducers 43a and 43b by record gates 51a and 51b, respectively. Thus, delayed sequence $H_{21}$ and undelayed sequence $H_{12}$ are recorded in tracks 1a and 1b, respectively.

By reason of delay circuit 90, the data words which are recorded in one track are not in time-alignment with their related data words in the other track. Thus, record gates 51a and 51b both may be actuated, or turned ON simultaneously, and even if recording noise is introduced by reason of this actuation of the record gates, such recording noise may distort or obliterate time-aligned data words in the respective tracks; but such distorted data words are not related to each other. Hence, even though these data words in both tracks may be distorted, they may be recovered from the undistorted related data word and associated error check word which are spaced apart therefrom. For example, let it be assumed that the first data block in both tracks 1a and 1b is distorted. With reference to FIGS. 19E and 19F, this means that data words $W_2$ and $W_4$, and error check word $P_{-277}$ in track 1b is distorted. This also means that data words $W_{-139}$ and $W_{-137}$ and error check word $P_{-419}$ in track 1a are distorted. However, this does not distort data words $W_1$ and $W_3$, which are upstream of the distorted data words in track 1a, nor does this distort error check words $P_1$ and $P_3$, which also are upstream of the distorted data words. Consequently, the distorted data word $W_2$ may, nevertheless, be recovered by way of $W_2 = P_1 - W_1$. Similarly, the distorted data word $W_4$ may be recovered from $W_4 = P_3 - W_3$.

Figure 18:
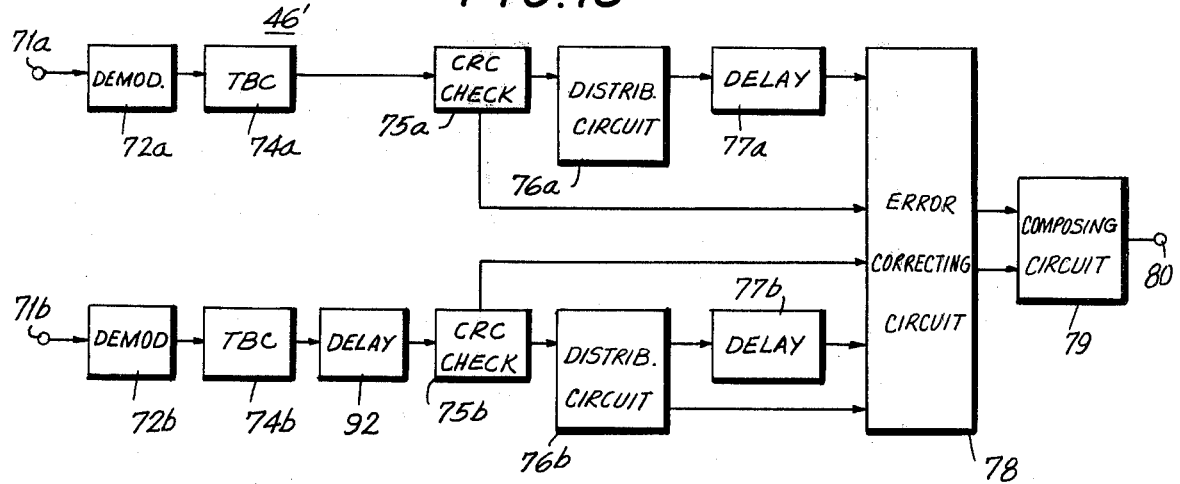
FIG. 18 is a block diagram of decoder apparatus which may be used with the embodiment of FIG. 16.

Decoder 46', used in the embodiment of FIG. 16, is illustrated in FIG. 18. Encoder 46' is seen to be substantially similar to aforedescribed decoder 46, except that in the presently described embodiment, a delay circuit 92 is connected between time base corrector 74b and CRC check circuit 75b. Also, in FIG. 18, in the interest of simplification, synchronizing separator circuits 73a and 73b are not shown. To avoid redundant description thereof, further explanation of the construction of decoder 46' is omitted.

In operation, the sequences $H_{21}$ and $H_{12}$ (FIGS. 19F and 19A, respectively) recorded in tracks 1a and 1b, are reproduced by reproducing transducers 42a and 42b, respectively, and these sequences are demodulated and time base corrected in demodulators 72a, 72b and time base correctors 74a, 74b, respectively. Sequence $H_{12}$, which, it is recalled, had not been delayed in recording, now is delayed by delay circuit 92 by an amount equal to q data blocks. The effect of this delay is to bring the related data words in their respective sequences into time-alignment with each other. Thus, the sequences supplied to CRC check circuits 75a and 75b are similar to sequences $H_{11}$ and $H_{12}$, shown in FIG. 19E. That is, data words $W_1$ and $W_2$ are supplied to CRC check circuits 75a and 75b, respectively, in time-alignment. The remaining related data words likewise are supplied to the CRC check circuits in time-alignment with each other. It is appreciated, therefore, that the delay imparted by delay circuit 92 is equal to the delay imparted by delay circuit 90, for example, a delay of 5 time blocks, as shown in FIG. 19F.

CRC check circuits 75a and 75b function in the manner described above to produce error signals in the event that an error is present in a time block supplied thereto. Such error signals are supplied to and used by error correcting circuit 78. CRC check circuits 75a and 75b also supply sequential data blocks to distributing circuits 76a and 76b, respectively. These distributing circuits remove the interleaved error check words from the data blocks supplied thereto, thereby separating the data words and error check words. Distributing circuit 76a thus provides, at its upper output, successive ones of the odd-numbered data words $W_1$, $W_3$, ...; and distributing circuit 76b provides, at its upper output, successive ones of the even-numbered data words $W_2$, $W_4$, and the like. At the time that distributing circuit 76a separates data words $W_1$ and $W_3$ from the data block supplied thereto, it also provides, at its lower output, the error check word $P_{-279}$. Similarly, at the time that distributing circuit 76b separates data words $W_2$ and $W_4$ from the data block supplied thereto, it also provides, at its lower output, the error check word $P_{-277}$. The odd-numbered data words and the even-numbered words are delayed by an amount comparable to d data blocks by delay circuits 77a and 77b, respectively. This delay brings error check word $P_1$, then being separated by distributing circuit 76a, into time-alignment with delayed data word $W_1$ and delayed data word $W_2$, the latter data words being produced at the outputs of delay circuits 77a and 77b, respectively. Similarly, error check $P_3$, which then is separated by distributing circuit 76b, is brought into time-alignment with delayed data words $W_3$ and $W_4$ produced at the outputs of delay circuits of 77a and 77b, respectively.

It is appreciated that delayed, related data words are supplied to error correcting circuit 78 in time-alignment with their associated error check words. That is, delay circuits 77a and 77b supply data words $W_1$ and $W_2$ to error correcting circuit 78 in time-alignment with error check word $P_1$. These delay circuits also supply data words $W_3$ and $W_4$ to the error correcting circuit in time-alignment with error check word $P_3$. It is the combination of these data and error check words, together with the error signals produced by CRC check circuits 75a and 75b, that enable error correcting circuit 78 to produce correcting data words at its respective outputs. As an example, error-corrected odd-numbered data words are provided at the upper output of error correcting 78 and error-correcting even-numbered data words are provided at the lower output thereof. Composing circuit 79 alternates, or interleaves, these error-corrected data words to recover the original sequence of data words $H_0$, this original sequence being shown in FIG. 19A.

It is recalled that the error-corrected sequence $H_0$ is supplied to edit circuit 48 whereat these originally-recorded digital signals are mixed with edit signals to produce the mixed digital signals $S_3$. The mixed digital signals $S_3$ then are supplied as the sequence $H_0$ to decoder 50', all as described above.

Figure 20:
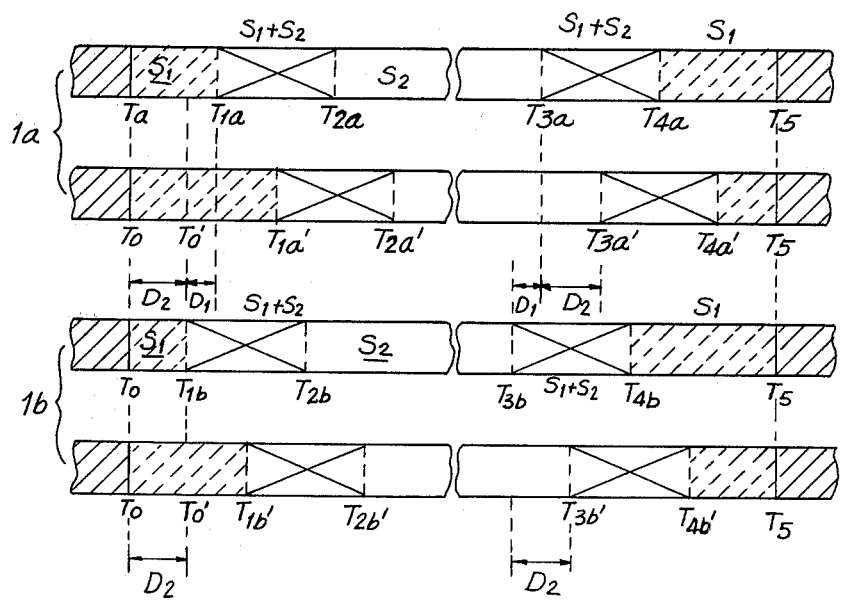
FIG. 20 is useful in understanding the operation of the encoder and decoder apparatus of FIGS. 17 and 18.

A schematic representation of record tracks 1a and 1b, as recorded by the embodiment shown in FIG. 16, is illustrated in FIG. 20. FIG. 20 is similar to aforedescribed FIG. 15 in that each record track is schematically represented as an upper track in which the data words are recorded and a lower track in which the error check words are recorded. Of course, in practice, each of tracks 1a and 1b is constituted by a single track in which both the data and error check words are recorded.

In FIG. 20, the location $T_i$, and also $T'_i$, represent the locations along the respective record tracks at which signals are recorded at corresponding times $t_i$, at which times various steps in the edit operation are carried out. For example, at time $t_0$, corresponding to location $T_0$, the edit operation is initiated. It is recalled that, in initiating the edit operation, switch control pulse $P_1$ is produced to actuate, or turn ON, record switches 51a and 51b. At time $t_1$, corresponding to location $T_1$, start edit control pulse $P_2$ is produced to actuate edit circuit 48. It is recalled that, when the edit circuit first is actuated, the cross-fade operation in the cut-in mode is carried out. This cross-fade operation terminates at time $t_2$, corresponding to location $T_2$. At time $t_3$, corresponding to location $T_3$, the stop edit control pulse $P_2$ is produced to actuate edit circuit 48 to carry out the cross-fade operation in the cut-out mode. This cross-fade operation terminates at time $t_4$, corresponding to location $T_4$. Finally, at time $t_5$, corresponding to location $T_5$, switch control pulse $P_1$ terminates to terminate the cut-out operation and thus end the edit mode.

In more detail, at time $t_0$ (corresponding to location $T_0$) record switches 51a and 51b are simultaneously actuated, or turned ON, by switch control pulse $P_1$. When these record switches are thus actuated, the originally-recorded digital signals $S_1$, reproduced from the magnetic tape by reproducing transducers 42a and 42b, are supplied through encoder 50' and the actuated record switches for re-recording on the magnetic tape. Of course, the error check words which are recorded in track 1a, as well as the error check words which are recorded in track 1b, are delayed from their related data words by reason of delay circuit 65. This delay is represented by distance $D_2$ from location $T_0$ to location $T'_0$. As discussed above with respect to FIG. 15, during this interval $T_0$–$T'_0$, the error check words are recorded, which error check words are associated with the data words that had been recorded prior to location $T_0$.

At location $T_{1b}$, the mixing digital signals $S_3=S_1+S_2$, supplied by edit circuit 48, commence recording on track 1b. It is seen, however, from FIG. 17 that delay circuit 90 imparts a delay, equal to the distance $D_1$, to these mixed digital signals $S_3$ which are to be recorded in track 1a. Thus, the mixed digital signals $S_3$ are not recorded in track 1a until location $T_{1a}$. The distance between locations $T_{1b}$ and $T_{1a}$ is equal to $D_1$. It also is seen, from FIG. 20, that the error check word which is associated with the data word that had been recorded at location $T_{1b}$ is recorded, in track 1b, at the delayed location $T'_{1b}$, wherein $T_{1b}$—$T'_{1b}$ is equal to the distance $D_2$. Similarly, as also shown in FIG. 20, the error check words which is associated with the data word that is recorded at location $T_{1a}$ in track 1a is recorded at the delayed location $T'_{1a}$. This delay in the recording of the error check words with respect to their associated data words is, of course, determined by delay circuit 65.

The cross-fade operation for the cut-in mode is carried out with respect to track 1b during the interval $T_{1b}$–$T_{2b}$. The cross-fade operation for the cut-in mode is carried out with respect to track 1b during the interval $T_{1a}$–$T_{2a}$. This latter interval is delayed, or spaced, from the first-mentioned interval $T_{1b}$–$T_{2b}$ by the distance $D_1$. This distance $D_1$ is determined by the delay imparted into the digital signals recorded in track 1a by delay circuit 90. Of course, the error check words which are associated with these mixed digital signals $S_3$ are recorded at a delayed time, that is, during the intervals $T'_{1b}$–$T'_{2b}$ and $T'_{1a}$–$T'_{2a}$, respectively.

Following the cross-fade operation in each track, the edit digital signals $S_2$ are recorded. This is represented by the blank portion of tracks 1a and 1b in FIG. 20. Then, when the cross-fade operation of the cut-out mode is initiated, the mixed digital signals $S_3$ are recorded in track 1b during the interval $T_{3b}$–$T_{4b}$ prior to the recording of these mixed digital signals in track 1a. As shown in FIG. 20, the recording of digital signals for the cross-fade operation is delayed in track 1a relative to track 1b by the delay imparted by delay circuit 90 (FIG. 17). The error check words which are associated with the data words, i.e. the mixed digital signals $S_3$, recorded during this cross-fade operation are recorded in time-delayed relation, as represented by the lower tracks associated with tracks 1a and 1b, respectively. Thus, the error check words associated with the mixed digital signals recorded in interval $T_{3b}$–$T_{4b}$ in track 1b are recorded during interval $T'_{3b}$–$T'_{4b}$. Similarly, the error check words which are associated with the data words that are recorded during interval $T_{3a}$–$T_{4a}$ in track 1a are recorded during interval $T'_{3a}$–$T'_{4a}$.

Finally, at the termination of the cut-out mode, that is, at location $T_5$, switch control pulse $P_1$ terminates so as to deactuate, or turn OFF record switches 51a and 51b simultaneously. From location $T_{4b}$ to location $T_5$, the originally-recorded digital signals $S_1$ are re-recorded. From location $T_{4a}$, which is delayed by the amount $D_1$ from location $T_{4b}$, attributed to the delay of delay circuit 90, originally-recorded digital signals $S_1$ are re-recorded. The error check words associated with these re-recorded digital signals in track 1b are recorded during interval $T'_{4b}$–$T_5$; and the error check words which are associated with the re-recorded digital signal in track 1a are recorded during interval $T'_{4a}$–$T_5$.

It is seen that, in accordance with the operation of the embodiment shown in FIGS. 16–18, record gates 51a and 51b may be actuated and deactuated simultaneously, but the resultant switch noise which may occur therefrom which may distort the data which is recorded in tracks 1a and 1b will not, nevertheless, prevent recovery of such distorted data. That is, distortion due to, for example, drop-out, burst error and the like, will affect only one of the two related data words because such data words are substantially separated from each other in their respective tracks. Furthermore, the error check word associated with these related data words are further spaced therefrom so as to further reduce the possibility of totally preventing distorted data from being recovered by error correction means. Hence, the embodiment of FIGS. 16–18 performs a function analogous to that performed by the embodiment of FIGS. 9–14. The significant difference between these two embodiments is that the record gates in FIG. 9 are operated at different times, whereas these record gates in FIG. 16 are operated simultaneously.

While the present invention has been particularly shown and described with reference to various embodiments wherein the edit operation was shown as an insert edit operation, it should be readily appreciated that an assemble edit operation may be carried out by this invention. In the assemble edit operation, new, or edit digital signals, such as the recording of replacement signals, is carried out at the end, or head (or tail) of a complete block of data. That is, the replacement data is not inserted between two segments of original data. Instead, it merely follows the segment of original data.

Also, instead of the aforedescribed cross-fade operation, other gradual replacement techniques may be used, such as a fade-out operation followed by a fade-in operation, wherein originally-recorded signals gradually are reduced to a zero value and then the replacement, or edit signals gradually are increased from a zero value to a predetermined value (such as unity). Still further, if the time base of the replacement signals $S_2$ is adjusted to be equal to the time base of the original signals $S_1$, the cross-fade operation may be minimized or, ideally, avoided. In that event, the effective values of the original and replacement signals will be equal at the edit point.

It is contemplated that the source of replacement signals $S_2$ may be a digital memory device, such as a solid-state memory circuit. If the originally-recorded signals $S_1$ are read from the magnetic tape and stored in such a memory device, and then the replacement signals are substituted for such original signals in that memory device, then the resultant edited digital signals may be recorded directly from that memory device onto the magnetic tape. In such an embodiment, the very same transducer, or transducers, may be used both for reproducing the originally recorded signals and for recording the edit signals. It is appreciated that such an edit operation is not carried out in so-called time. In the embodiments described above, the use of separate reproducing and recording transducers enables real time editing.

Various other changes and modifications in form and details may be made to the present invention without departing from the spirit and scope thereof. For example, and as mentioned above, the respective transducers may be stationary devices, or heads; or such transducers may be rotary heads, such as used in videotape recording (VTR) equipment. Furthermore, the error check word $P_i$ may be produced from the full adding code, as described above, or other coding techniques may be used. For example, a modulo-2 adding code, such as a simple parity code, as well as other error correcting codes may be used to produce the error check word. Also, since the error correcting techniques which may be used with the present invention, in conjunction with the CRC check code and error-correcting recording codes may be conventional, one of ordinary skill in the art will be familiar with, and thus be enabled to implement and use such error correcting techniques. It is intended that the appended claims be interpreted as including the foregoing as well as various other changes and modifications.

What is claimed is:

1. Apparatus for editing digital signals recorded on a record medium, comprising reproducing means for reproducing said digital signals from said record medium; recording means for recording digital signals on said record medium, said recording means being relatively spaced from said reproducing means; delay means for delaying the digital signals reproduced from said record medium by a time delay determined by the relative spacing between said recording and reproducing means; a source of edit digital signals; mixing means for mixing the delayed reproduced digital signals and the edit digital signals by gradually decreasing the value of one while concurrently gradually increasing the value of the other and combining the decreasing and increasing signals such that one of said digital signals gradually is replaced by the other; and means for supplying the mixed digital signals to said recording means.

2. The apparatus of claim 1 wherein said mixing means comprises first digital multiplying means for multiplying said delayed reproduced digital signals with a multiplier constant whose value changes gradually with respect to time; second digital multiplying means for multiplying said edit digital signals with the complement of said multiplier constant, and summing means for summing the multiplied digital signals to produce said mixed digital signals.

3. The apparatus of claim 2 wherein said mixing means further comprises means for generating start and stop edit control signals; and a source of said multiplier constant, said source being said complement of said multiplier constant and responsive to said start edit control signal to decrease said multiplier constant stepwise with respect to time from a predetermined value to a substantially zero value and to concurrently increase said complement of said multiplier constant stepwise with respect to time from said substantially zero value to said predetermined value, said source of multiplier constant and complement thereof being responsive to said step edit control signal to decrease said complement of said multiplier constant stepwise with respect to time from said predetermined value to said substantially zero value and to concurrently increase said multiplier constant stepwise with respect to time from said substantially zero value to said predetermined value.

4. The apparatus of claim 3 wherein said predetermined value is unity.

5. The apparatus of claim 1 wherein said means for supplying the mixed signals to said recording means comprises switch means responsive to the initiation of an edit operation to enable said mixed signals to be supplied to said recording means and responsive to the completion of said edit operation to inhibit said mixed signals from being supplied to said recording means.

6. The apparatus of claim 5 wherein said means for supplying further comprises means for generating start and stop edit control signals and for generating switch control signals; said start edit control signal being operative to actuate said mixing means and said stop edit control signal being operative to de-actuate said mixing means; and said switch control signals being operative to enable said switch means in advance of the actuation of said mixing means, whereby said delayed reproduced digital signals are re-recorded on said record medium, and to disable said switch means subsequent to the de-actuation of said mixing means whereby the mixed digital signals followed by the edit signals, followed by the mixed digital signals, followed by the delayed reproduced digital signals are recorded, in sequence, on said record medium.

7. The apparatus of claim 1 wherein said digital signals recorded on said record medium are constituted by a sequence of data blocks, each data block having at least two successive data words and an error check word associated with said data words.

8. The apparatus of claim 7 wherein said sequence of data blocks is formed of a synchronizing signal followed by n data blocks followed by an error correcting code word.

9. Apparatus for editing digital signals recorded on a record medium constituted by a sequence of data blocks, each data block having a plurality of data words and an error check word, said error check word being associated with the data words in a data block spaced therefrom by d data blocks, said apparatus comprising reproducing means for reproducing said data blocks from said record medium; recording means for recording data blocks on said record medium, said recording means being relatively spaced from said reproducing means; delay means for delaying the digital signals reproduced from said record medium by a time delay determined by the relative spacing between said recording and reproducing means; a source of edit digital signals; mixing means for mixing the delayed reproduced digital signals and the edit digital signals by gradually decreasing the value of one while concurrently gradually increasing the value of the other and combining the decreasing and increasing signals such that one of said digital signals gradually is replaced by the other; and means for supplying the mixed digital signals to said recording means.

10. The apparatus of claim 9 wherein said reproducing means includes means for separating the data words and error check word in each data block; additional delay means for delaying the separated data words by an amount corresponding to d data blocks, and error correcting means for receiving the delayed data words in a block and the separated error check word to produce error-corrected data words as a function of the received error check word.

11. The apparatus of claim 10 wherein said means for supplying the mixed digital signals to said recording means includes means for supplying said mixed digital signals in a sequence of data words; error check word generating means for receiving said sequence of data words and for generating an error check word as a function of a predetermined number of said data words; delay means for delaying said generated error check words by an amount corresponding to d data blocks; and composing means for composing successive data blocks by inserting a delayed error check word following said predetermined number of data words, said data blocks being supplied in sequence to said recording means.

12. Apparatus for editing digital signals recorded on a record medium, as a channel of data words, said channel being recorded in plural parallel tracks, each track containing a sequence of data blocks with each data block having plural data words and an error check word, a data word in a data block in one track being associated with a corresponding data word in a corresponding data block in another track, and said error check word being associated with at least one data word in a data block recorded in a common track and spaced therefrom by m data blocks, said apparatus comprising reproducing means for reproducing said data blocks from said plural tracks; recording means for recording data blocks in said plural tracks, said recording means being relatively spaced from said reproducing means; delay means for delaying the digital signals reproduced from said record medium by a time delay determined by the relative spacing between said recording and reproducing means; a source of edit digital signals; mixing means for mixing the delayed reproduced digital signals and the edit digital signals by gradually decreasing the value of one while concurrently gradually increasing the value of the other and combining the decreasing and increasing signals such that one of said digital signals gradually is replaced by the other; and means for supplying the mixed digital signals to said recording means.

13. The apparatus of claim 12 wherein said error check word in a data block is associated with a data word in a data block recorded in said common track and spaced therefrom by m data blocks and also is associated with a data word in a data block corresponding to said spaced data block and recorded in another parallel track.

14. The apparatus of claim 12 wherein said reproducing means includes recovery means for recovering the data blocks from said parallel tracks and re-forming a single channel of data words; and wherein said means for supplying the mixed digital signals to said recording means comprises separating means for separating said mixed digital signals into first and second sequences of data words, plural data words in each sequence being included in a data block, first switch means operative to supply said first sequence of data blocks for recording in a first track, second switch means operative to supply said second sequence of data blocks for recording in a second parallel track, and switch control means for delaying the operation of said second switch means relative to said first switch means.

15. The apparatus of claim 14 further comprising edit control means for initiating the operation of said mixing means subsequent to the operation of said second switch means.

16. The apparatus of claim 15 wherein said means for supplying the mixed digital signals to said recording means further comprises error check word generating means responsive to a data word in said first sequence of data words and to a corresponding data word in said second sequence of data words to generate an associated error check word; delay means for delaying each error check word by an amount corresponding to m data blocks; and means for alternately inserting successive error check words into said first and second sequences of data words to form first and second sequences of data blocks.

17. The apparatus of claim 16 wherein said reproducing means comprises transducer means for reproducing first and second sequences of data blocks from first and second parallel tracks; means for separating the data words and the error check word from each reproduced data block in said respective sequences; delay means for delaying the separated data words in said respective sequences by an amount corresponding to m data blocks, whereby the delayed data words in said respective sequences are associated with the error check word then being separated; error correcting means responsive to the error check word then being separated for correcting errors in said delayed data words; and means for re-forming a single channel of said error-corrected data words.

18. The apparatus of claim 12 wherein said means for supplying the mixed digital signals to said recording means comprises separating means for separating said mixed digital signals into first and second sequences of data words, plural data words in each sequence being included in a data block; delay means for delaying one of said sequences of data blocks relative to the other by an amount corresponding to q data blocks; and first and second switch means for supplying the delayed and undelayed sequences of data blocks to said recording means for concurrent recording in first and second parallel tracks, respectively.

19. The apparatus of claim 18 wherein said separating means comprises distributing means for distributing said mixed signals into said first and second sequences of data words; error check word generating means responsive to a data word in said first sequence of data words and to a corresponding data word in said second sequence of data words to generate an associated error check word; delay means for delaying each error check word by an amount corresponding to m data blocks; and means for alternately inserting successive error check words into said first and second sequences of data words to form said first and second sequences of data blocks.

20. The apparatus of claim 19 wherein said reproducing means comprises tranducer means for reproducing said delayed and undelayed sequences of data blocks from said first and second parallel tracks; means for delaying said undelayed sequence of data blocks by an amount corresponding to q data blocks; means for separating the data words and the error check word from each data block in said respective sequences; means for delaying the separated data words in said respective sequences by an amount corresponding to m data blocks, whereby the delayed separated data words in said respective sequences are associated with the error check word then being separated; means responsive to said error check word then being separated for correcting errors in said delayed separated data words; and means for re-forming a single channel of said error-corrected data words.

21. Apparatus for editing digital signals recorded in first and second tracks on a record medium, said digital signals being in the form of blocks of data words recorded in said respective track, each block including plural data words and an error check word, said error check word being associated with pairs of data words in aligned blocks that are spaced from the block in which said error check word is included, said aligned blocks being in respective tracks, said apparatus comprising reproducing transducers for concurrently reproducing first and second sequences of blocks of data words from said first and second tracks; recording transducers for concurrently recording first and second sequences of blocks of data words in said first and second tracks, respectively, said recording transducers being relatively spaced from said reproducing transducers; means for delaying the reproduced data words by a time delay corresponding to the relative spacing between said recording and reproducing transducers; a source of replacement words; replacing means for gradually replacing said delayed data words with said replacement words to produce edit words; first switch means operative to supply a first sequence of blocks of edit words to one of said recording transducers; second switch means operative to supply a second sequence of blocks of edit words to another recording transducer; and switch control means for operating said first switch means in advance of said second switch means.

22. The apparatus of claim 21 wherein said replacing means comprises multiplier constant generator means operative in response to a first actuating signal to generate a progressively decreasing multiplier constant from a predetermined value to zero and to generate a progressively increasing complementary multiplier constant from zero to said predetermined value, said multiplier constant generator means being operative in response to a second actuating signal to generate a progressively increasing multiplier constant from zero to said predetermined value and to generate a progressively decreasing complementary multiplier constant from said predetermined value to zero; control means for producing said first actuating signal after said first and second switch means operate, so as to initiate an edit operation, and for producing said second actuating signal to terminate said edit operation; multiplying means for multiplying said delayed data words by said multiplier constant and for multiplying said edit words by said complementary multiplying constant, respectively; and summing means for summing the multiplied data and edit words.

23. The apparatus of claim 21 further comprising means coupled to said reproducing transducers for converting said first and second sequences of blocks of data words into a single channel of successive data words.

24. The apparatus of claim 23 wherein said means for converting comprises first separating means for receiving said first sequence of blocks and for separating said plural data words and said error check word from each block; second separating means for receiving said second sequence of blocks and for separating said plural data words and said error check word from each block; first and second delay means for delaying the plural data words separated by said first and second separating means, respectively, said delay bringing the separated error check word into time alignment with its associated data words in said respective sequences; error correcting means responsive to said separated error check word and to said delayed, associated data words in said respective sequences to correct errors in said data words; and means for merging said error-corrected data words in said respective sequences into a single channel of successive data words.

25. The apparatus of claim 24 further comprising means coupled to said replacing means for converting said edit words into said first and second sequences of blocks of edit words.

26. The apparatus of claim 25 wherein said means for converting said edit words into said first and second sequences of blocks of edit words comprises means for separating said edit words into first and second sequences of edit words; error check word generating means responsive to an edit word in each of both sequences of edit words to generate an error check word associated with both edit words; delay means for delaying said generated error check words by a predetermined amount; and means for inserting alternate ones of said delayed error check words into said first and second sequences of edit words, respectively, successive error check words in each sequence being separated by plural edit words, thereby forming first and second sequences of blocks of edit words.

27. Apparatus for editing digital signals recorded in first and second tracks on a record medium, said digital signals being in the form of blocks of data words recorded in said respective tracks, each block including plural data words and an error check word, the blocks of data words in said first and second tracks being delayed with respect to each other, and the error check word in one block being associated with a data word in a different block in said first track and with a data word in yet another block in said second track, said apparatus comprising reproducing transducers for concurrently reproducing first and second sequences of blocks of data words from said first and second tracks, the first and second sequences of blocks being delayed with respect to each other; recording transducers for concurrently recording first and second sequences of blocks of data words in said first and second tracks, respectively, said recording transducers being relatively spaced from said reproducing transducers; means for delaying the reproduced data words by a time delay corresponding to the relative spacing between said recording and reproducing transducers; a source of replacement words; replaceing means for gradually replacing said delayed data words with said replacement words to produce edit words; means for providing said edit words in first and second sequences of blocks time-delayed with respect to each other; and first and second switch means concurrently operative to supply said first and second sequences of blocks of edit words to said recording transducers.

28. The apparatus of claim 27 wherein said replacing means comprises multiplier constant generator means operative in response to a first actuating signal to generate a progressively decreasing multiplier constant from a predetermined value to zero and to generate a progressively increasing complementary multiplier constant from zero to said predetermined value, said multiplier constant generator means being operative in response to a second actuating signal to generate a progressively increasing multiplier constant from zero to said predetermined value and to generate a progressively decreasing complementary multiplier constant from said predetermined value to zero; control means for producing said first actuating signal after said first and second switch means operate, so as to initiate an edit operation, and for producing said second actuating signal to terminate said edit operation; multiplying means for multiplying said delayed data words by said multiplier constant and for multiplying said replacement words by said complementary multiplier constant, respectively; and summing means for summing the multiplied data and replacement words to produce said edit words.

29. The apparatus of claim 27 further comprising means coupled to said reproducing transducers for converting said first and second sequences of blocks of data words into a single channel of successive data words.

30. The apparatus of claim 29 wherein said means for converting comprises means for delaying one of said sequences of blocks of data words relative to the other so as to bring said first and second sequences into time-alignment; first and second separating means for receiving said time-aligned first and second sequences of blocks of data words, respectively, to separate said plural data words and said error check word from each block; first and second delay means for delaying the plural data words separated by said first and second separating means, respectively, said delay bring the separated error check word into time-alignment with its associated data words; error correcting means responsive to said separated error check word and delayed, associated data words to correct errors in said data words; and means for merging said error-corrected data words into a single channel of successive data words.

31. The apparatus of claim 30 wherein said means for providing said edit words in first and second sequences of blocks time-delayed with respect to each other comprises means for separating said edit words into first and second substantially time-aligned sequences of edit words, error check word generating means responsive to time-aligned edit words in said first and second sequences of edit words to generate an error check word associated with said time-aligned edit words; delay means for delaying said generated error check words by a predetermined amount; means for inserting alternate ones of said delayed error check words into said first and second time-aligned sequences of edit words, respectively, successive error check words in each time-aligned sequence being separated by plural edit words, thereby forming first and second time-aligned sequences of blocks of edit words; and means for delaying said first and second sequences of blocks of edit words relative to each other.

32. A method of editing digital signals recorded on a record medium, comprising the steps of reproducing said digital signals from said record medium; delaying the digital signals reproduced from said record medium by a predetermined time delay; providing edit digital signals; mixing the delayed reproduced digital signals and the edit digital signals by gradually decreasing the value of one while concurrently gradually increasing the value of the other and combining the decreasing and increasing signals such that one of said digital signals gradually is replaced by the other; and recording the mixed digital signals on said record medium, said recording being delayed from said reproducing by said predetermined time delay.

33. The method of claim 32 wherein said step of mixing comprises multiplying said delayed reproduced digital signals with a multiplier constant whose value changes gradually with respect to time; multiplying said edit digital signals with the complement of said multiplier constant; and summing the multiplied digital signals to produce said mixed digital signals.

34. The method of claim 33 wherein said step of mixing further comprises generating start and stop edit control signals; decreasing said multiplier constant stepwise with respect to time from a predetermined value to a substantially zero value and concurrently increasing said complement of said multiplier constant stepwise with respect to time from said substantially zero value to said predetermined value in response to said start edit control signal; and decreasing said complement of said multiplier constant stepwise with respect to time from said predetermined value to said substantially zero value and concurrently increasing said multiplier constant stepwise with respect to time from said substantially zero value to said predetermined value in response to said stop edit control signal.

35. The method of claim 34 wherein said predetermined value is unity.

36. The method of claim 32 further comprising the step of re-recording the reproduced digital signals in response to the initiation of an edit operation and prior to the recording of said mixed digital signals.

37. The method of claim 36 further comprising the step of re-recording the reproduced digital signals for a predetermined interval following the termination of the edit operation.

38. A method of editing digital signals recorded on a record medium constituted by a sequence of data blocks, each data block having a plurality of data words and an error check word, said error check word being associated with the data words in a data block spaced therefrom by d data blocks; said method comprising the steps of reproducing said data blocks from said record medium; delaying the data blocks reproduced from said record medium by a predetermined time delay; providing edit digital signals; mixing the digital signals included in the delayed reproduced data blocks and edit digital signals by gradually decreasing the value of one while concurrently gradually increasing the value of the other and combining the decreasing and increasing signals such that one of said digital signals gradually is replaced by the other; and recording the mixed digital signals on said record medium in the form of data blocks, said recording being delayed from said reproducing by said predetermined time delay; and wherein said step of reproducing includes separating the data words and error check word in each data block; delaying the separated data words by an amount corresponding to d data blocks, and correcting errors in the data words as a function of the separated error check word and delayed data words.

39. The method of claim 38 wherein said step of recording the mixed digital signals includes supplying said mixed digital signals in a sequence of data words; receiving said sequence of data words and generating an error check word as a function of a predetermined number of said data words; delaying said generated error check words by an amount corresponding to d data blocks; and composing successive data blocks by inserting a delayed error check word following said predetermined number of data words, said data blocks being recorded in sequence.

40. A method of editing digital signals recorded on a record medium as a channel of data words, said channel being recorded in plural parallel tracks, each track containing a sequence of data blocks with each data block having plural data words, wherein a data word in a data block in one track is associated with a corresponding data word in a corresponding data block in another track, and wherein each data block additionally has an error check word, said error check word being associated with at least one data word in a data block recorded in a common track and spaced therefrom by m data blocks and also with a data word in a data block in time-alignment with said spaced data block and recorded in another parallel track, said method comprising the steps of reproducing said data blocks from said parallel tracks; delaying the digital signals included in the data blocks reproduced from said parallel tracks by a predetermined time delay; providing edit digital signals; mixing the delayed reproduced digital signals and edit digital signals by gradually decreasing the value of one while concurrently gradually increasing the value of the other and combining the decreasing and increasing signals such that one of said digital signals gradually is replaced by the other; and recording the mixed digital signals in the form of data blocks in said parallel tracks on said record medium, said recording being delayed from said reproducing by said predetermined time delay.

41. The method of claim 40 wherein said step of reproducing includes recovering the data blocks from said parallel tracks and re-forming a single channel of data words; and wherein said step of recording comprises separating said mixed digital signals into first and second sequences of data words, plural data words in each sequence being included in a data block, supplying said first sequence of data blocks for recording in a first track, supplying said second sequence of data blocks for recording in a second parallel track, and delaying the supply of said second sequence of data blocks relative to said first.

42. The method of claim 41 wherein said step of recording further comprises generating an associated error check word in response to a data word in said first sequence of data words and to a corresponding data word in said second sequence of data words; delaying each error check word by an amount corresponding to m data blocks; and alternately inserting successive error check words into said first and second sequences of data words to form first and second sequences of data blocks.

43. The method of claim 42 wherein said step of reproducing comprises reproducing first and second sequences of data blocks from first and second parallel tracks; separating the data words and the error check word from each reproduced data block in said respective sequences; delaying the separated data words in said respective sequences by an amount corresponding to m data blocks, whereby the delayed data words in said respective sequences are associated with the error check word then being separated; correcting errors in said delayed data words in response to the error check word then being separated; and re-forming a single channel of said error-corrected data words.

44. The method of editing digital signals recorded on a record medium as a channel of data words, said channel being recorded in plural parallel tracks, each track containing a sequence of data blocks with each data block having plural data words, wherein a data word in one data block in one track is associated with a corresponding data word in a data block in another track, said data block in said other track being displaced from said one data block by q data blocks, and wherein each data block additionally has an error check word, said error check word being associated with a data word in a data block recorded in a common track and spaced therefrom by m data blocks and also being associated with a data word in a data block recorded in said other track, said method comprising the steps of reproducing said data blocks from said parallel tracks; delaying the digital signals included in the data blocks reproduced from said parallel tracks by a predetermined time delay; providing edit digital signals; mixing the delayed reproduced digital signals and edit digital signals by gradually decreasing the value of one while concurrently gradually increasing the value of the other and combining the decreasing and increasing signals such that one of said digital signals gradually is replaced by the other; and recording the mixed digital signals in the form of data blocks in said parallel tracks on said record medium, said recording being delayed from said reproducing by said predetermined time delay.

45. The method of claim 44 wherein said step of recording comprises separating said mixed digital signals into first and second sequences of data words, plural data words in each sequence being included in a data block; delaying one of said sequences of data blocks relative to the other by an amount corresponding to q data blocks; and supplying the delayed and undelayed sequences of data blocks for concurrent recording in first and second parallel tracks, respectively.

46. The method of claim 45 wherein said step of recording further comprises generating an associated error check word in response to a data word in said first sequence of data words and to a corresponding data word in said second sequence of data words; delaying each error check word by an amount corresponding to m data blocks; and alternately inserting successive error check words into said first and second sequences of data words to form said first and second sequences of data blocks.

47. The method of claim 46 wherein said step of reproducing comprises reproducing said delayed and undelayed sequences of data blocks from said first and second parallel tracks; delaying said undelayed sequence of data blocks by an amount corresponding to q data blocks; separating the data words and the error check word from each data block in said respective sequences; delaying the separated data words in said respective sequences by an amount corresponding to m data blocks, whereby the delayed separated data words in said respective sequences are associated with the error check word then being separated, correcting errors in said delayed separated data words in response to the error check word then being separated; and re-forming a single channel of said error-corrected data words.

* * * * *